United States Patent [19]
Sato

[11] Patent Number: 5,508,810
[45] Date of Patent: Apr. 16, 1996

[54] IMAGE RECORDER FOR PROPERLY ORIENTING OUTPUT IMAGES

[75] Inventor: Takako Sato, Yokohama, Japan

[73] Assignee: Ricoh Company, Ltd., Tokyo, Japan

[21] Appl. No.: 435,622

[22] Filed: May 5, 1995

Related U.S. Application Data

[63] Continuation of Ser. No. 961,632, Oct. 16, 1992, abandoned.

[30] Foreign Application Priority Data

Oct. 17, 1991 [JP] Japan ................................. 3-269149

[51] Int. Cl.$^6$ .......................... H04N 1/387; H04N 1/393; H04N 1/04; G06K 9/32
[52] U.S. Cl. .......................... 358/296; 358/448; 358/451; 358/488; 382/294; 382/297
[58] Field of Search ................................. 358/296, 405, 358/406, 434, 443, 444, 448, 451, 452, 488; 355/208; 395/105, 109, 115, 116, 117, 137, 146; 382/276, 287, 289–298

[56] References Cited

U.S. PATENT DOCUMENTS

| | | | |
|---|---|---|---|
| 4,277,163 | 7/1981 | Ikesue et al. | 355/208 |
| 4,995,089 | 2/1991 | Altrieth, III | 382/297 |
| 5,038,218 | 8/1991 | Matsumoto | 358/296 |
| 5,177,617 | 1/1993 | Tuhro | 358/296 |
| 5,195,174 | 3/1993 | Kagawa | 395/109 X |
| 5,199,101 | 3/1993 | Cusick et al. | 395/115 |
| 5,239,388 | 8/1993 | Matsumoto | 358/448 |
| 5,260,805 | 11/1993 | Barrett | 358/451 X |
| 5,276,742 | 1/1994 | Dasari et al. | 382/46 |
| 5,301,036 | 4/1994 | Barrett et al. | 358/448 |
| 5,337,161 | 8/1994 | Hube | 358/448 |
| 5,410,417 | 4/1995 | Kuznicki et al. | 358/488 X |

*Primary Examiner*—Peter S. Wong
*Assistant Examiner*—Eric Frahm
*Attorney, Agent, or Firm*—Oblon, Spivak, McClelland, Maier & Neustadt

[57] ABSTRACT

An image recoder capable of automatically correcting irregularities in the orientation of an image among reproductions. A direction of characters in an input image is determined by character recognition. The orientation of an output image corresponding to the input image is automatically changed, so that all the reproductions are oriented in the same direction. When an image should be rotated 90 degrees or 270 degrees, it is automatically reduced or changed in layout to accommodate the entire output image in a recordable range.

8 Claims, 24 Drawing Sheets

| Fig. 4A |
| Fig. 4B |

| Fig. 5 |
|---|
| Fig. 5A |
| Fig. 5B |

1ST DOCUMENT

2ND DOCUMENT

PAPER (FRONT) IN 2-SIDED COPY MODE & 1ST DOCUMENT COPY

PAPER FEED

IMAGE ON FRONT

PAPER (REAR) IN 2-SIDED COPY MODE & 2ND DOCUMENT COPY

IMAGE ON REAR

| DIRECTION CODE | 1 | 2 | 3 | 4 |
|---|---|---|---|---|
| |  | あ |  |  |
| | 0° | 90° | 180° | 270° |

IMAGE RECORDER FOR PROPERLY ORIENTING OUTPUT IMAGES

This application is a Continuation of application Ser. No. 07/961,632, filed on Oct. 16, 1992, now abandoned.

BACKGROUND OF THE INVENTION

1. Field of the Invention

The present invention relates to an image recorder for recording an input image on a recording medium, e.g., a paper sheet and, more particularly, to a digital copier.

2. Discussion of the Background

It is a common practice with a copier to reproduce an input image faithfully on a paper sheet or similar recording medium. Therefore, the orientation of the image reproduced on a paper sheet depends on that of the document image to be read. It follows that when a stack of documents to be copied are partly oriented in one direction and partly in the other direction with respect to top and bottom, the resulting reproductions are also oriented in opposite directions. Moreover, in a copier operable in a two-sided copy mode, a paper sheet carrying an image on one side thereof is turned over to form another image on the other side thereof. It is likely with this type of copier that the images formed on both sides of the paper sheet are opposite to each other with respect to the top and bottom direction since the paper sheet is turned over. Specifically, assume that documents on which writings printed laterally, as in this specification, are positioned such that their to-and-bottom direction coincides with an intended direction of paper transport. As such documents are reproduced in the two-sided copy mode, the first line on the front of a paper sheet and adjoining the upper edge (leading ede) of the paper sheet is positioned in the vicinity of the lower edge (trailing edge) of the rear of the paper sheet after the turn-over. More specifically, the last line on the rear substantially coincides with the first line on the front, i.e., the top-and-bottom direction differs from the front to the rear. To eliminate this problem, every other document may be turned upside down, or the documents may be repositioned to make their top-and-bottom direction perpendicular to the paper transport direction. This, however, imposes a troublesome task on the operator.

Moreover, even when a writing is written laterally throughout a stack of documents, it may occur that some documents are vertically long while the others are horizontally long. In such a case, it is impossible to position the stack such that the top-and-bottom direction does not coincide with the paper feed diretion throughout the documents, i.e., a writing is unavoidably reproduced upside down on the rear of some copies.

A copier capable of eliminating the problems discussed above has not been reported yet.

SUMMARY OF THE INVENTION

It is therefore an object of the present invention to provide an image recorder which automatically prevents images from being reproduced in irregular orientations.

It is another object of the present invention to provide an image recorder which automatically prevents images formed on the front and rear of a paper sheet in a two-sided copy mode from being opposite in orientation to each other.

It is another object of the present invention to provide an image recorder which automatically corrects irregularities among images even when vertically long documents and horizontally long documens are stacked together.

An image recorder of the present invention comprises an inputting section, for inputting image data representative of a document, a storing section for storing the image data inputted by the inputting section, a direction determining section for processing the image data stored in the storing section to determine a direction of character data included in the image data, a direction changing section for changing, when the direction of characters determined by the direction determining section differs from a predetermined direction, an orientation of an output image relative to the input document image by turning the output image upside down or rotating the output image, and a recording section for recording the image data oriented in the predetermined direction on a predetermined recording medium.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1A:
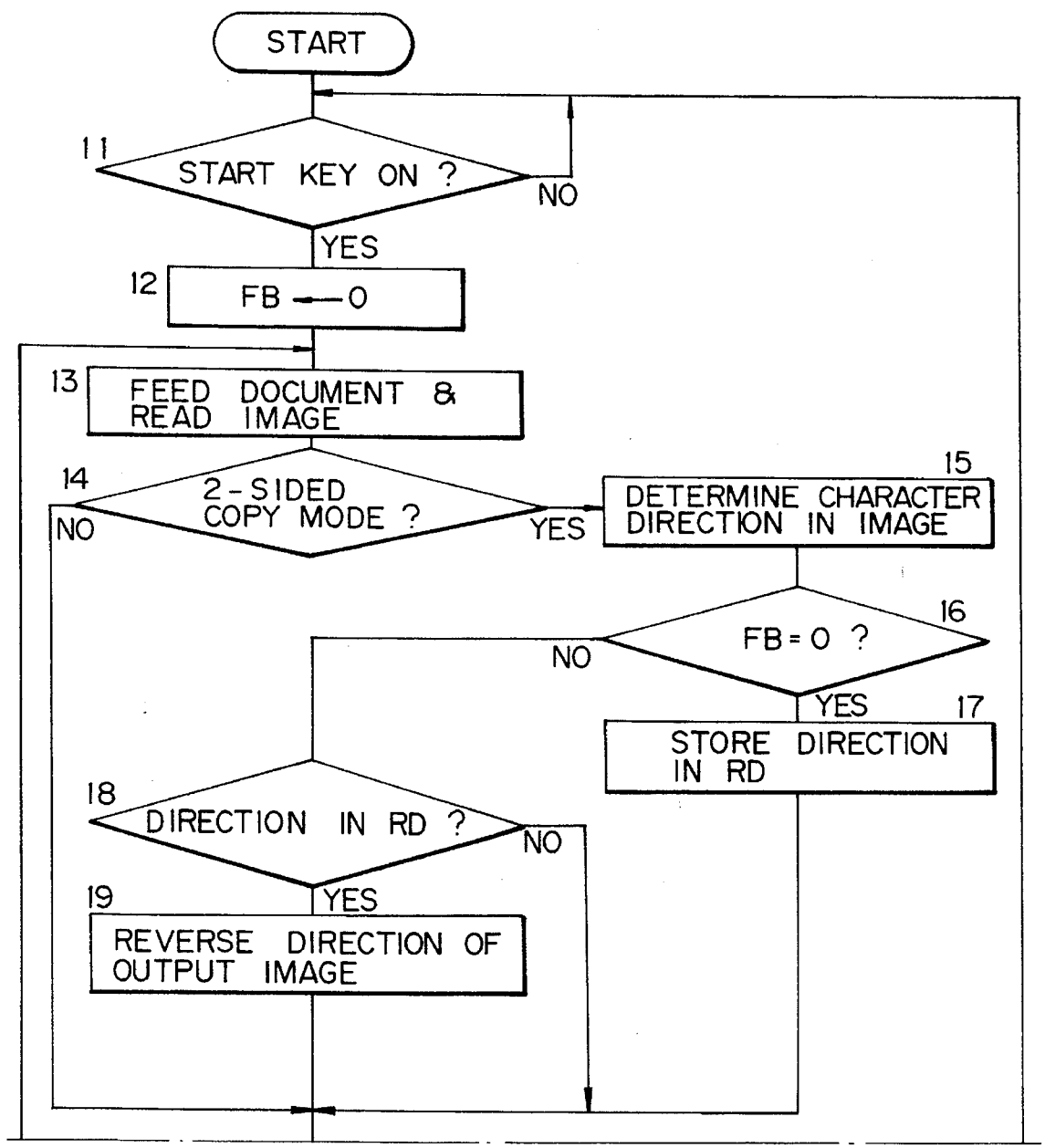
FIG. 1 is a flowchart demonstrating a specific operation of a system controller.

Briefly, the present invention processes character data included in an input image to determine the direction of each character, determines whether or not the image should be turned upside down or rotated on the basis of the determined direction of characters, and then records an output image on a recording medium after turning or rotating it, if necessary. Therefore, even when various kinds of documents images are processed together, characters are reproduced in the same orientation. It follows that in a two-sided copy mode characters are positioned in the same orientation on the front and rear of a recording mdium without requiring documents being reoriented beforehand.

If use is made of a character recognition technology disclosed in, for example, Japanese Patent Laid-Open Publication (Kokai) No. 84395/1989 or No. 84396/1989, it is possible to determine the position of each character included in an input image, i.e., 0 degrees, 90 degrees, 180 degrees or 270 degrees. This kind of technology is applicable to the present invention as direction determining means. However, the problem is that some characters included in a writing are directionless, and the directions of some characters are difficult to identify. Moeover, a single document may even contain a plurality of lines of characters which are different in direction. Hence, simply detecting the direction of a single character is apt to fail to determine the direction of the entire document image with accuracy.

In accordance with the present invention, a direction is determined with each of a plurality of characters located at different positions in an image. The direction of the character lines in the image is determined on the basis of the determined direction of the individual characters, whereby the erroneous detection of a direction is reduced. Specifically, the influence of directionless characters and characters with indefinite directions is reduced. If a direction is determined on, for example, a majority basis, even a document containing a plurality of lines of characters different in direction can have the direction of major lines of characters thereof detected.

If a particular fixed direction of characters is used as a reference, it is likely that an image which does not have to be turned upside down or rotated is done so, increasing the copying time. For example, in a two-sided copy mode, an image to be reproduced on the front of a paper sheet usually does not have to be turned upside down or rotated. In accordance with the present invention, a reference position is determined on the basis of the direction of characters included in an image to be formed on the front of a paper sheet, so that only the image to be formed on the rear is turned or rotated, as needed. This is successful in reducing the copying time.

Generally, documents and recording sheets usable with a copier, for example, have a rectangular shape which is vertically long or horizontally long. In this condition, should a vertically long document image be rotated 90 degrees and reproduced on a vertically long recording sheet to regulate the direction of characters, the rotated image might exceed the recordable range of the sheet and be partly lost. In accordance with the present invention, when the direction of an output image is changed by rotation, the output image is enlarged or reduced on the basis of the size of an input image in the widthwise or lengthwise direction and the size of a recording sheet in the lengthwise or widthwise direction. The resulting output image has a size matching the area of the recording sheet, i.e., the former is fully accommodated in the latter.

However, when an image is reduced, characters included therein become smaller and difficult to read. Moreover, the reduction produces a substantial blank area on a recording sheet, degrading the appearance of a copy. In accordance with the present invention, when an ouput image is reoriented by rotation, an output image is produced in which the positions where character data should be arranged are different from those of an input image in matching relation to the size of the input image in the widthwise or lengthwise direction and the size of a recording sheet in the lengthwise or widthwise direction. Specifically, assuming that the document and the recording sheet have the same size, i.e., the same area, all the character data can be accommodated in the recordable range of the sheet without being reduced after the 90 degrees rotation of the image. For this purpose, the positions to be assumed by the characters are changed by, for example, changing the new paragraph position of character lines.

Further, since a document has a blank area between consecutive lines, an output image which has undergone rotation has to be provided with blank areas reflecting those of an input image. The problem in this respect is that should all the blank areas of an input image be rearranged in the same manner as character areas, the position where lines of character should begin, for example, is deviated from the beginning of the lines. This, as well as other deviations in layout, makes a writing on a reproduction difficult to read. In accordance with the present invention, when an outut image is reoriented by rotation, the positions where character data should be located are rearranged on the basis of the size of the input image in the widthwise or lengthwise direction and the size of the recording medium in the lengthwise or widthwise direction. In addition, each blank area between consecutive character lines in the input image are identified. As a result, an output image is provided with a blank area identical with the blank area of an input image between character lines thereof. Since the blank area (space) between lines is identical with that of the input image, the remaining blank area is prevented from being inserted between nearby character lines. This makes a writing on a reproduction easy to read.

Figure 2:
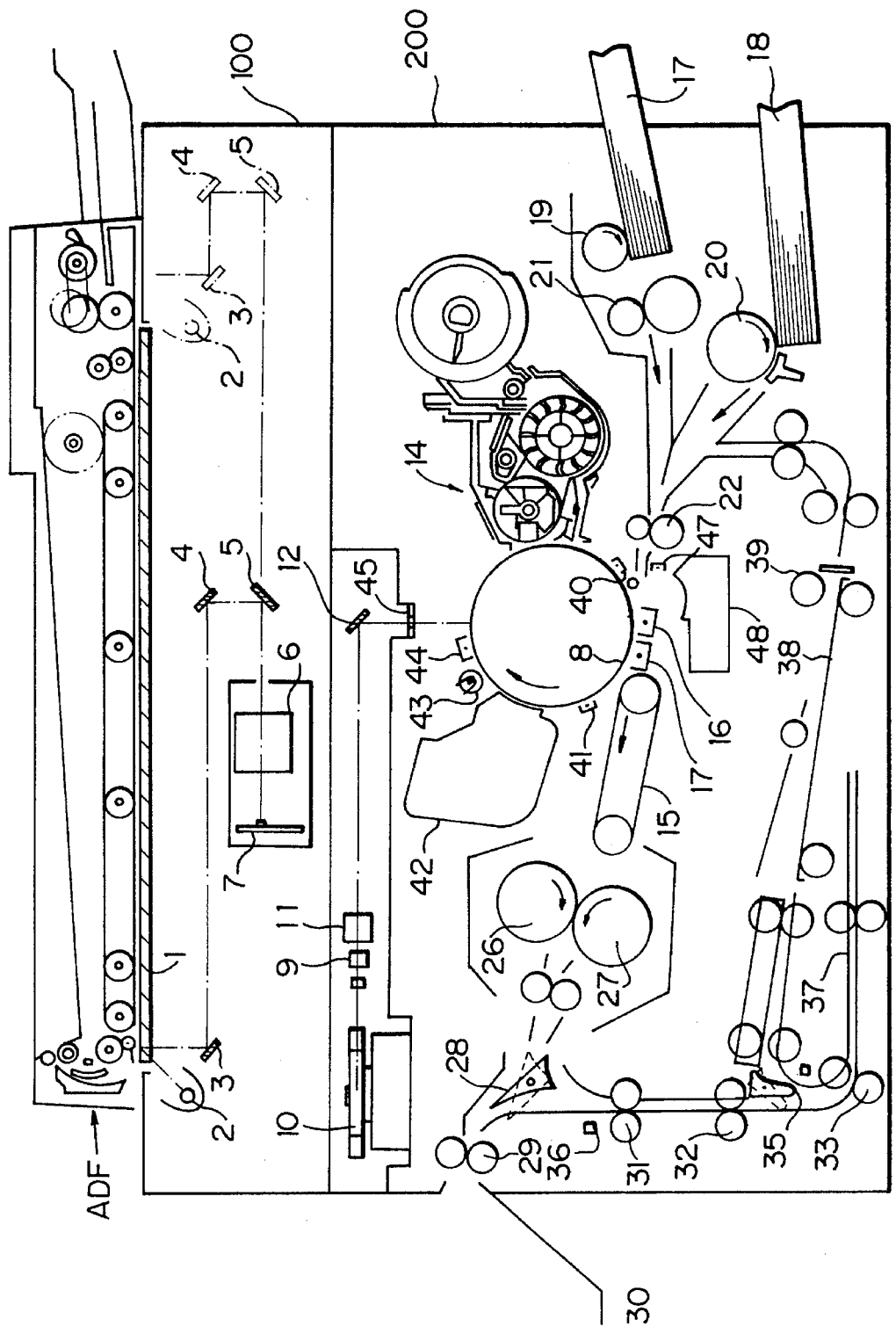
FIG. 2 is a section of an image recorder embodying the present invention and implemented as a digital copier.

Referring to FIG. 2 of the drawings, an image recorder embodying the present invention is shown and implemented as a digital copier by way of example. As shown, the copier is generally made up of an image scanner 100 and a printer 200. An automatic document feeder (ADF) is mounted on the top of the image scanner 100. The ADF feeds documents one by one and automatically locates each document at an image reading position on a glass platen 1. Scanning optics is disposed below the glass platen 1 and includes a lamp 2. Light issuing from the lamp 2 is reflected by the document laid on the glass platen 1 and is then routed through a first mirror 3, a second mirror 4, a third mirror 5, and a lens 6 to a monodimensional CCD (Charge Coupled Device) image sensor 7. A carriage, not shown, loaded with the lamp 2 and first mirror 3 and a carriage, not shown, loaded with the second and third mirrors 4 and 5 are mechanically moved in the right-and-left direction (subscanning direction), as viewed in the figure, at a speed ratio of 2:1, thereby scanning the entire document. The image scanner 100 reads the document image line by line in the main scanning direction with the CCD image sensor 7 to thereby read the entire bidimensional image.

The image read by the image scanner 100 is temporarily written to a memory, manipulated, if necessary, and then sent to the printer 200 as output image data. An image writing unit is included in the printer 200 and is made up of a laser 9, a polygonal mirror scanner 10, an f-theta lens 11, a mirror 12, and a dust glass 45. The laser emits a beam modulated by a bilevel signal corresponding to record/non-record of pixels of the image. The beam is reflected by the polygonal mirror scanner 10 and then focused onto the surface of a photoconductive element 8 via the f-theta lens 11, mirror 12 and dust glass 45. In the illustrative embodiment, the photoconductive element 8 is implemented by a drum.

A cleaning unit 42, a discharge lamp 43, a main charger 44, a developing unit 14, a transfer charger 16 and a separation charger 17 are arranged around the drum 8. The main charger 44 uniformly charges the surace of the drum 8 to a predetermined high potential. As the beam representative of the image scans the charged surface of the drum 8, the potential of the drum 8 changes. As a result, a potential distribution corresponding to the on/off of the beam, i.e., an electrostatic latent image is formed on the drum 8. The developing unit 14 causes a toner to deposit on the latent image due to the potential distribution, thereby converting the latent image to a toner image. A recording medium, e.g., paper sheet is fed from a paper cassette 17 or 18 and driven by a register roller 22 toward the drum 8 at a predetermined timing matching the image forming process. As the paper sheet meets the toner image formed on the drum 8, the transfr charger 16 transfers the toner image from the drum 8 to the paper sheet. The paper sheet carrying the toner image thereon is separated from the drum 8 by the separation charger 17 and is then transported by a belt 15 to a fixing roller 26. After the toner image has been fixed on the paper sheet by the roller 26, the paper sheet is driven to a discharge path.

A two-sided copy mode is available with the copier for reproducing an image on both sides of the paper sheet. In the two-sided copy mode, the paper sheet carrying the toner image on the front or first side thereof and which has left the fixing roller 26 is steered by path selectors implemented by pawls 28 and 35 into a turn passage 37, transported in the opposite direction, and then steered by the path selector 35 assuming a different position into an intermediate tray 38. To form an image on the rear or second side of the paper sheet, a feed roller 39 associated with the intermediate tray 38 is driven at a predetermined time for refeeding the paper sheet to the drum 8 via the register roller 22. Thereafter, the paper sheet, i.e., a two-sided copy, is transported by the belt 15 and driven out to the discharge path via the fixing roller 26.

Figure 8:
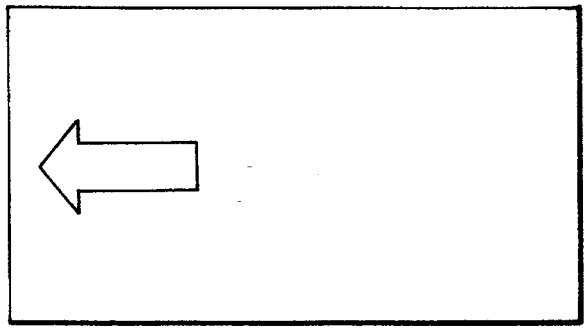
FIG. 8 is a plan view showing specific images printed on documents and images reproduced on a paper sheet.
Figure 8:
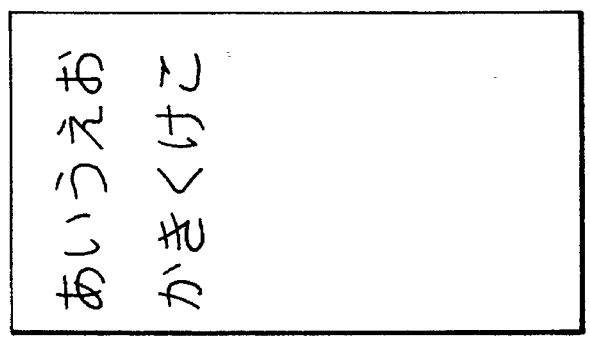
Figure 8:
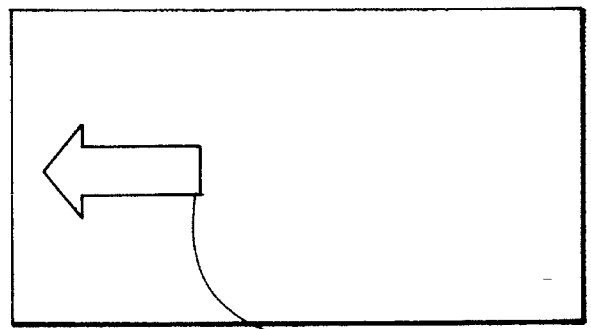
Figure 8:
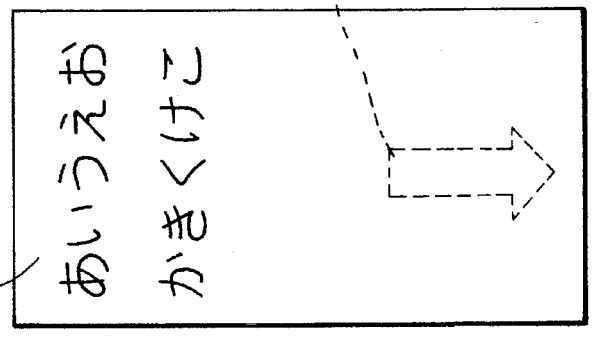
Figure 9:
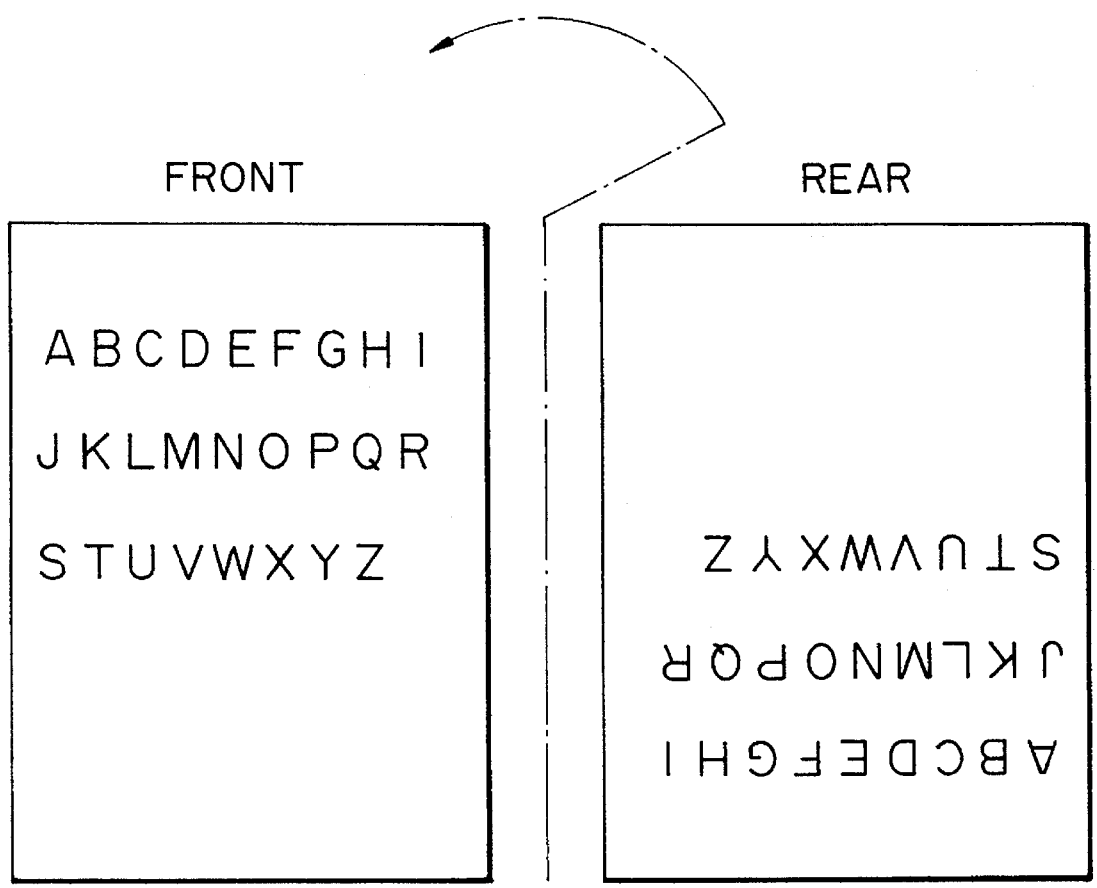
FIG. 9 is plan view showing images formed on the front and rear of a paper sheet.

When a conventional copier of the type described is operated in the two-sided copy mode, any erroneous prevents the images formed on both sides of the paper sheet from being oriented in the same direction. Specifically, in the two-sided copy mode operation, the paper sheet is turned over in the direction of paper transport in order to reproduce images on both sides thereof. Assume a document on which characters are printed laterally from the top to the bottom of the document. Then, the above procedure does not matter at all only if the lateral direction of the document coincides with the paper feed direction (right-and-left direction in FIG. 2). However, when the longitudinal direction of the document coincides with the paper feed direction, the images formed on both sides of the paper sheet are opposite to each other in the top-and-bottom direction, as shown in FIG. 8 specifically. More specifically, assume a paper sheet, or copy, shown in FIG. 9 on which characters are reproduced in one direction on one side and in the other direction on the other side with respect to top and bottom. Should such copies be bound at the right or left edge thereof as usual, a person has to turn the bound copies upside down every time the person turns over the pages.

The above problem may be eliminated if documents are arranged beforehand such that odd pages and even pages alternate in orientation. This, however, forces the operator to perform extra and troublesome work. Even a copier capable of reproducing documents of up to A3 size can copy a document of relatively small size, e.g., A4, if the document is positioned sideways. Therefore, if such a document is positioned sideways, i.e., such that the character lines extend in the same direction as the paper feed direction, the images on the front and rear of the resulting copy will have the same orientation with respect to top and bottom. However, assume a document of A3 size which can be oriented only in the lengthwise direction thereof. Then, the paper feed direction coincides with the top-and-bottom direction of the characters, causing images to be oriented in opposite directions on the front and rear of the resulting copy.

The illustrative embodiment has a function of automatically preventing images formed on the front and rear of a copy in the two-sided copy mode from being opposite to each other in the top-and-bottom direciton. This function is implemented by digital image processing, as will be descried later.

Figure 12A:
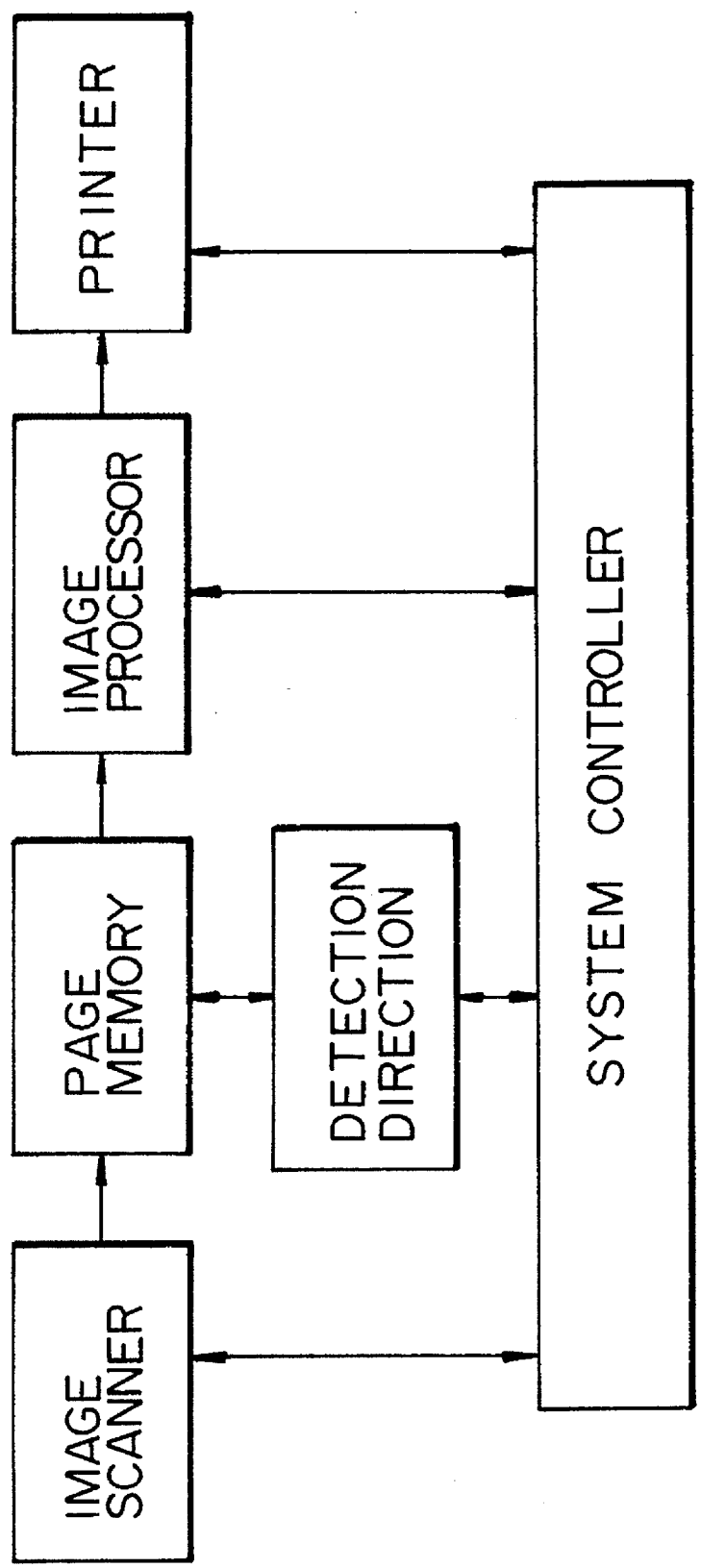
FIGS. 12A–12C are block diagrams each showing a specific electrical arrangement incorporated in the copier.

FIG. 12A shows an electrical arrangement included in the copier of FIG. 2. As shown, image data generated by the image scanner is temporarily stored in a page memory, subjected to predetermined processing by an image processor, and then sent to the printer. A system controller controls the operations of such constituents. A direction detecting section processes the document image stored in the page memory to determine the direction in which characters are positioned. In the two-sided copy mode, the system controller performs, in response to the output of the direction detecting section, control such that images to be formed on both sides of a paper sheet are idential in orientation in the top and-bottom direction.

Figure 1B:
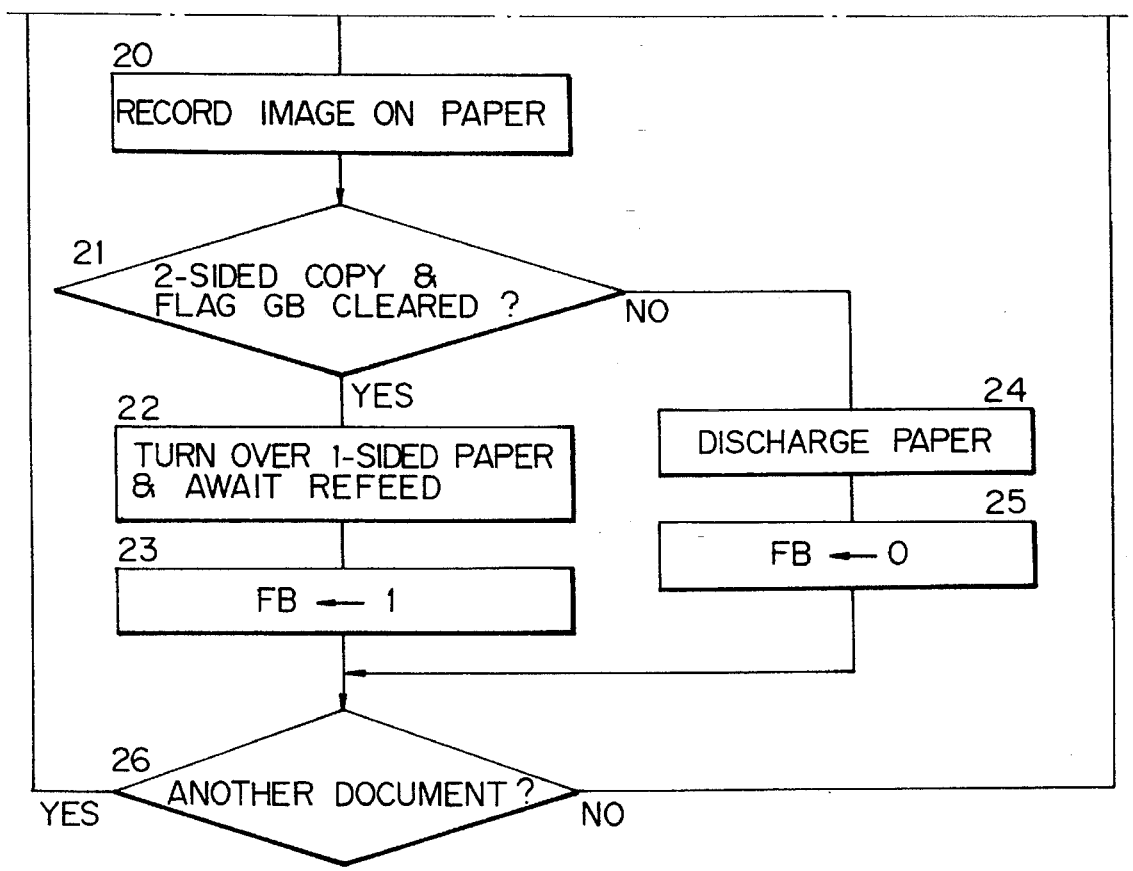

Specifically, the system controller executes an operation demonstrated in FIG. 1. As shown, when a copy start key is pressed (step 11), the controller clears a flag FB (step 12) and then causes the ADF to feed one document and locate it at the reading position on the glass platen 1 (step 13). The controller sends a read command to the image scanner 100. The image data sequentially generated by the image scanner 100 are written to the page memory. In the two-sided copy mode, the program advances from a step 14 to a step 15, i.e., the controller controls the direction detecting section to identify the direction of characters included in the image. If the flag FB has been cleared, i.e., in the event of front or first side copying as determined in a step 16, the controller stores a code representative of the detected direction in a register RD (step 17). Subsequently, the controller sends the image data from the page memory to the printer (step 20) to thereby reproduce the document image on the front of a paper sheet. In the two-sided copy mode and in the event of front copying, i.e., if the flag FB has been cleared, the operation advances to steps 21 and 22. As a result, the paper sheet carrying the image on the front thereof is turned over and then stored in the intermediate tray 38 to await refeed. In a step 23, the controller sets the flag FB.

Figure 11B:
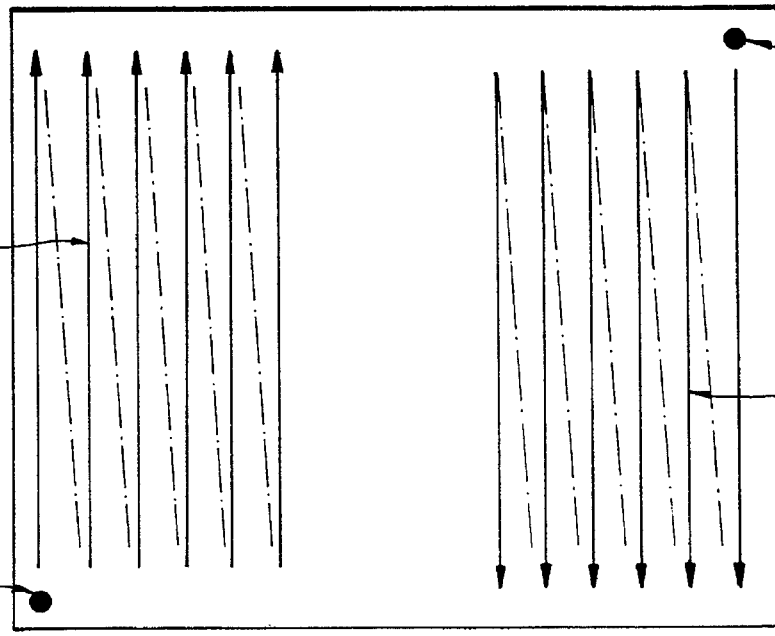
FIGS. 11A and 11B is a plan view showing a write start position and scanning direction in a page memory and a read start position and scanning direction.
Figure 11A:
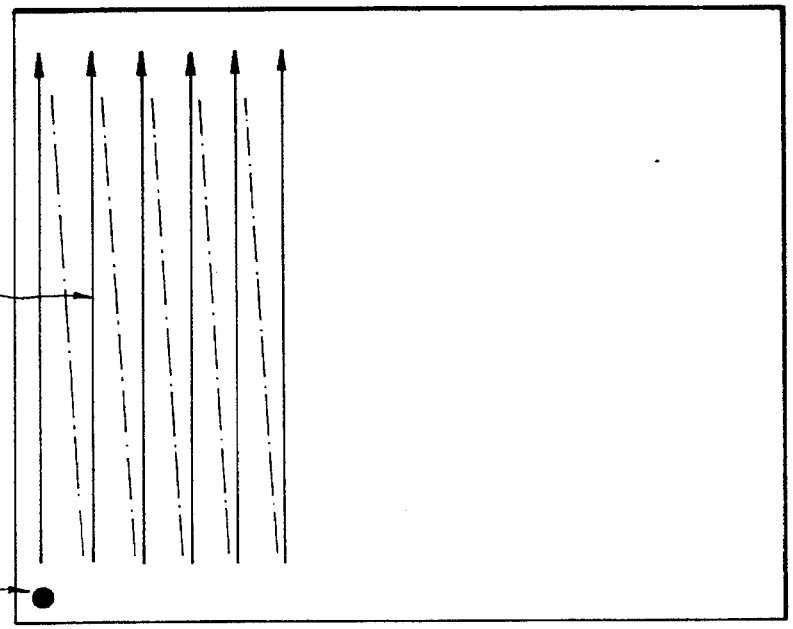

In the event of rear or second side copying to be effected in the two-sided copy mode, the step 16 is followed by a step 18. In the step 18, the controller compares the content of the register RD, i.e., the direction of characters of the image reproduced on the front with the direction of characters of an image to be reproduced this time. If the two directions are coincident, the controller reverses the direction of an output image to prevent the latter image from being opposite to the former image with respect to top and bottom (step 19). Usually, as shown in FIGS. 11A and 11B, a read start address A and a read scanning direction A are so selected as to coincide with a write start address and a write scanning direction in the page memory, so that an output image is generated according to the order of lines read. On the other hand, when a read start address B and a read scanning direction B are selected, the direction for writing an image in the page memory and the direction for reading it out are opposite to each other. Then, the image read out of the page memory is opposite in direction to the image read out of the document (rotated 180 degrees). Hence, in the step 19, the controller selects the read start address B and read scanning direction B to reverse the orientation of the output image. In the step 20, the output image is formed on the rear of the paper sheet. At this instant, since the flag FB has been set, the step 21 is followed by a step 24 for discharging the two-sided copy. The controller clears the flag FB in a step 25 and, thereafter, repeats the above procedure until all the documents have been reproduced.

Figure 3A:
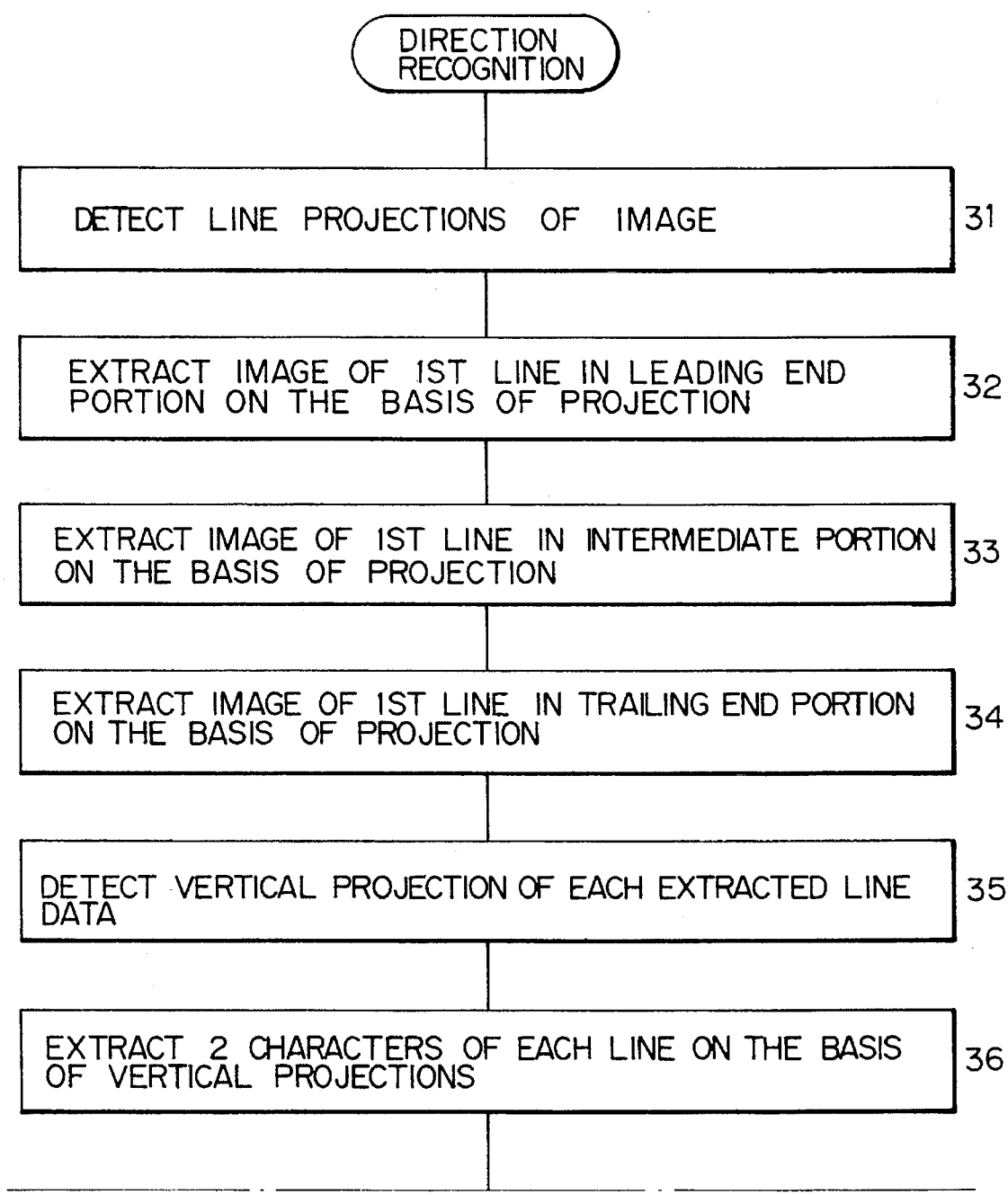
FIG. 3 is a flowchart representative of a specific operation of a direction detecting section.
Figure 3B:
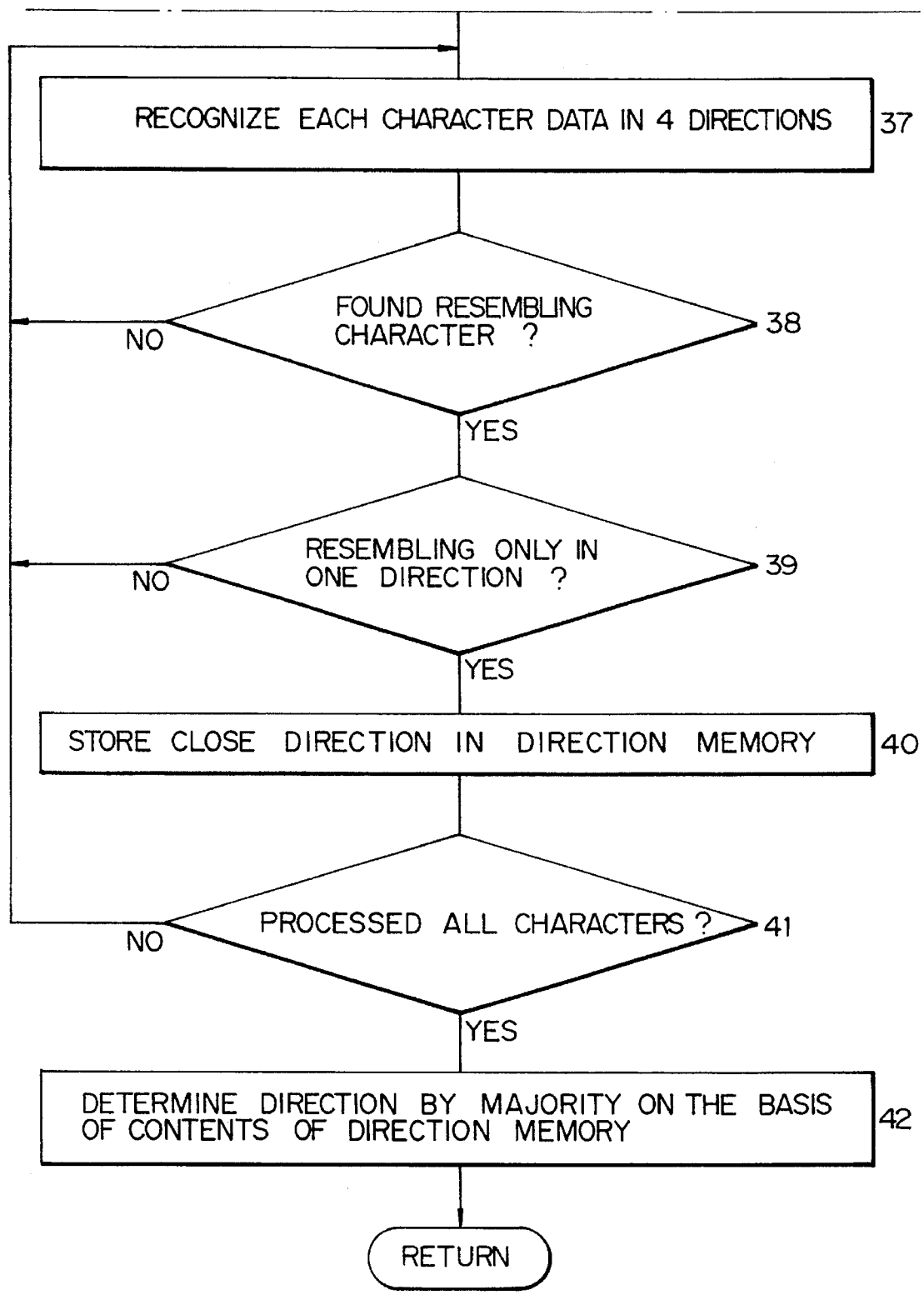
Figures 10A, 10B:
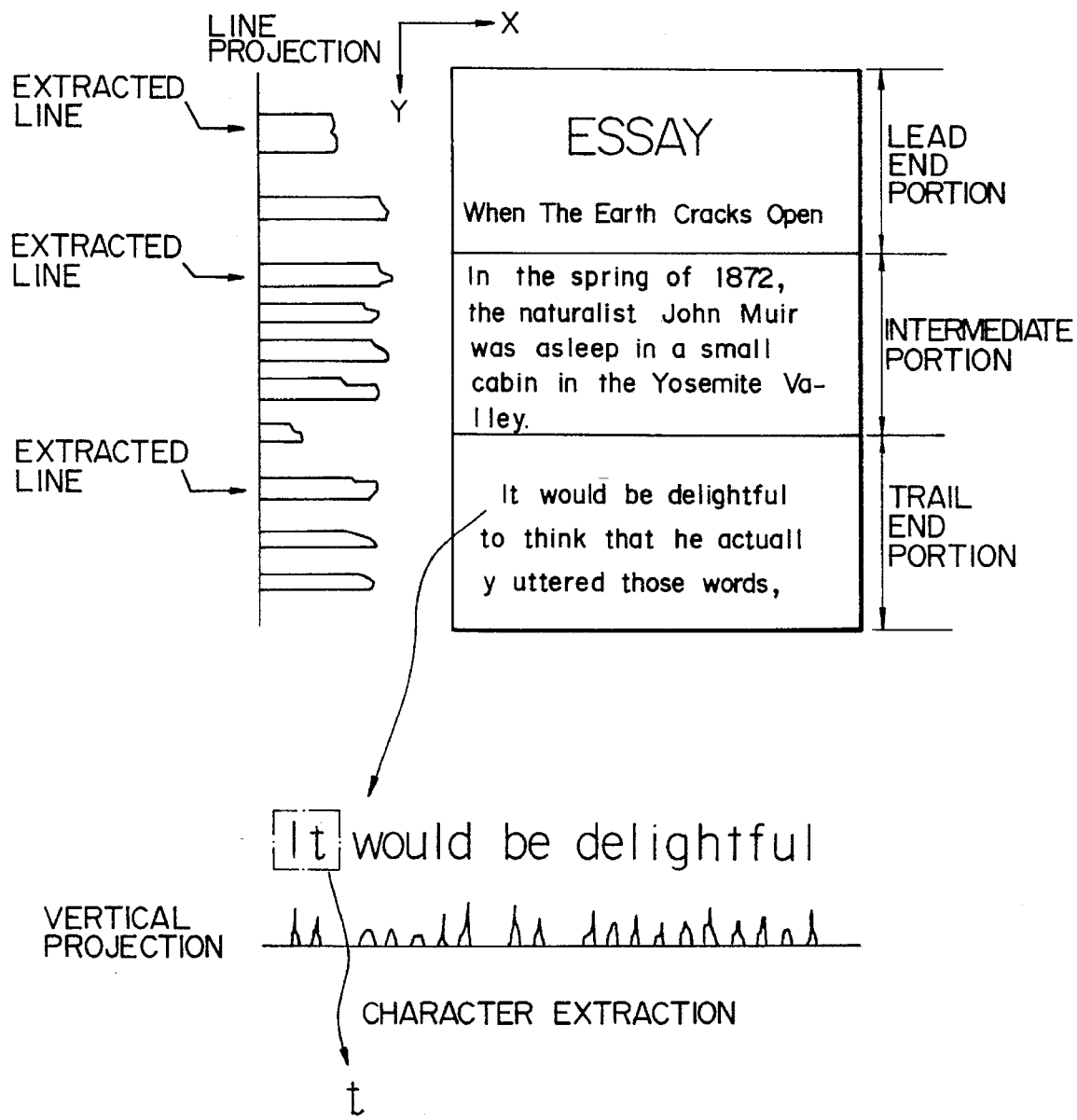
FIGS. 10A and 10B are plan view showing input image data and data being processed.

A specific operation of the direction detecting section is shown in FIG. 3 and will be described by taking specific image data shown in FIG. 10 as an example. To begin with, the detecting section processes the image data to detect projections of lines (step 1). Specifically, the detecting section counts black pixels on each of the lines extending in the direction X, FIGS. 10A and 10B, and passing the pixel positions in the direction Y, FIGS. 10A and 10B. In an area where lines with effective character data exist, the numbers of black pixels in the projections are sufficiently large while, in a blank area where characters or similar image components do not exist, the numbers of black pixels in the projections are zero or nearly zero. Therefore, by comparing the number of black pixels on each line with a threshold value, it is possible to determine a position where the result of comparison changes as the border between a character line and a space between character lines (blank). More specifically, it is possible to separate character line areas from the image data one by one on the basis of the projections.

As shown in FIGS. 11A and 11B, the illustrative embodiment equally divides the image area into a leading end portion, an intermediate portion, and a trailing end portion and extracts the character line appearing first in each of the three portions for the detection of a direction. Specifically, in a step 32, the detecting section extracts the image data (ESSAY) on the first line in the leading end portion on the basis of the projection of the first line. Likewise, the detecting section extracts the image data (In the spring of 1972,) on the first line in the intermediate portion (step 33), and then the image data (It would be delightful) on the first line in the trailing end portion (step 34).

In a step 35, the detecting section detects a projection in the vertical direction (in the direction of height of characters) with each of the extracted chracter line data. Specifically, the detecting section counts black pixels existing on the lines extending in the direction Y and at the successive pixel positions of the line data in the X direction. In an area where characters exist, the number of black pixels in the vertical projection is large while, in an area between characters (blank), it is zero or nearly zero. It follows that, by determining the numerical values in the vertical projections, it is possible to discriminate the area where the characters exist and the blank area between the characters. In the embodiment, in a step 36, the detecting section extracts the image data of leading two characters on each line on the basis of the vertical projections.

In a step 37, the detecting section recognizes the image data of each extracted character by turning it 0 degree, 90 degrees, 180 degrees and 270 degrees. Specifically, the detecting section detects characteristic data out of the image data and then searches a dictionary, not shown, to find resembling image data. As the detecting section finds a resembling character in any of the four directions, it advances from a step 38 to a step 39. If the character of interest resembles the extracted character only in one direction, the step 39 is followed by a step 40 for storing the direction of the character in a direction memory.

Since the embodiment extracts three character lines and extracts two characters out of each of them, six characters are processed in total. After recognizing all of the six characters (step 41), the detecting section references the contents of the direction memory to determine the direction of character data in the entire document image on a majority basis (step 42). Specifically, some characters such as I are directionless with respect to top and bottom or are often misidentified In addition, a document sometimes includes a plurality of character lines which are different in direction. In light of this, the detecting section determines the directions of a plurality of (at least three) characters and, based on the determined directions, selects one of them on a majority basis. Therefore, the detecting section is prevented from detecting a direction other than the direction of major character lines included in the document image.

Figures 4, 4A:
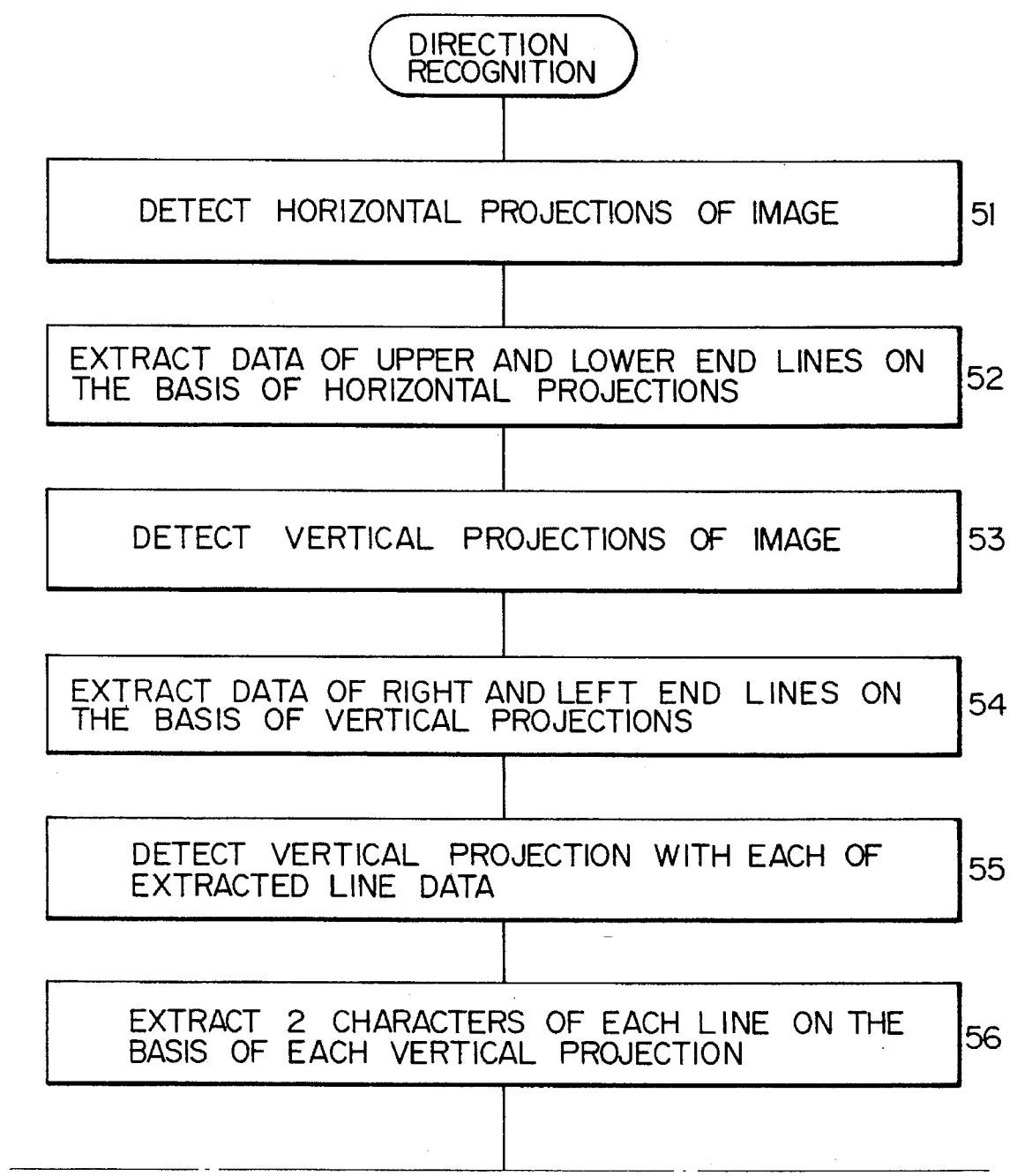
FIG. 4 is a flowchart showing another specific operation of the direction detecting section.
Figure 4B:
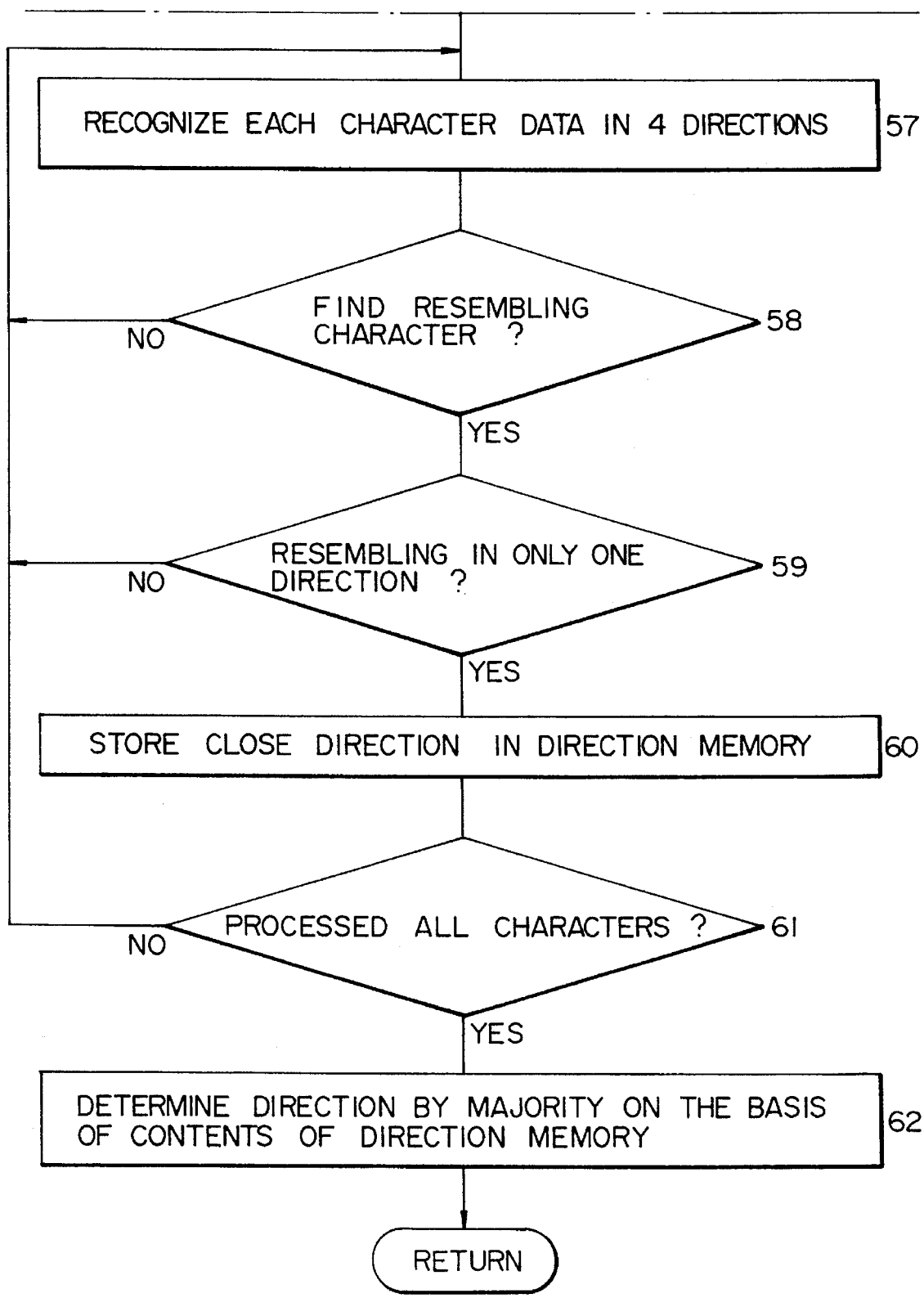

FIG. 4 is a flowchart representative of a modified procedure for direction identification. As shown in a step 51, horizontal projections of the image are detected. In a step 52, two horizontal character lines on the top and bottom of the image are extracted on the basis of the horizontal projections. In a step 53, vertical projections of the image are detected, and in a step 54 two vertical character lines at the right and left ends of the image are extracted. In a step 55, a columnar or vertical projection of each of the four character lines is detected. Finally, in a step 56, image data of two consecutive characters are extracted out of each character line on the basis of the vertical projections. This is followed by the same sequence of steps as in the previous procedure.

As stated above, the modified procedure extracts character image data out of two horizontal lines and two vertical lines delimiting the image and then detects the direction of each character. If the horizontal lines cannot be extracted, only the vertical lines are checked; if the vertical lines cannot be extracted, only the horizontal lines are checked. Specifically, it is likely that one image includes a plurality of character lines which are different in direction, that a group of horizontal character lines cannot be separated in the vertical direction, or that a group of vertical character lines cannot be separated in the horizontal direction. The modified procedure separates character lines in both of the horizontal and vertical directions, thereby reducing the probability of failure of separation of lines and the extraction of characters. This is successful in increasing the probability of successful detection of a direction of characters.

Figure 5A:
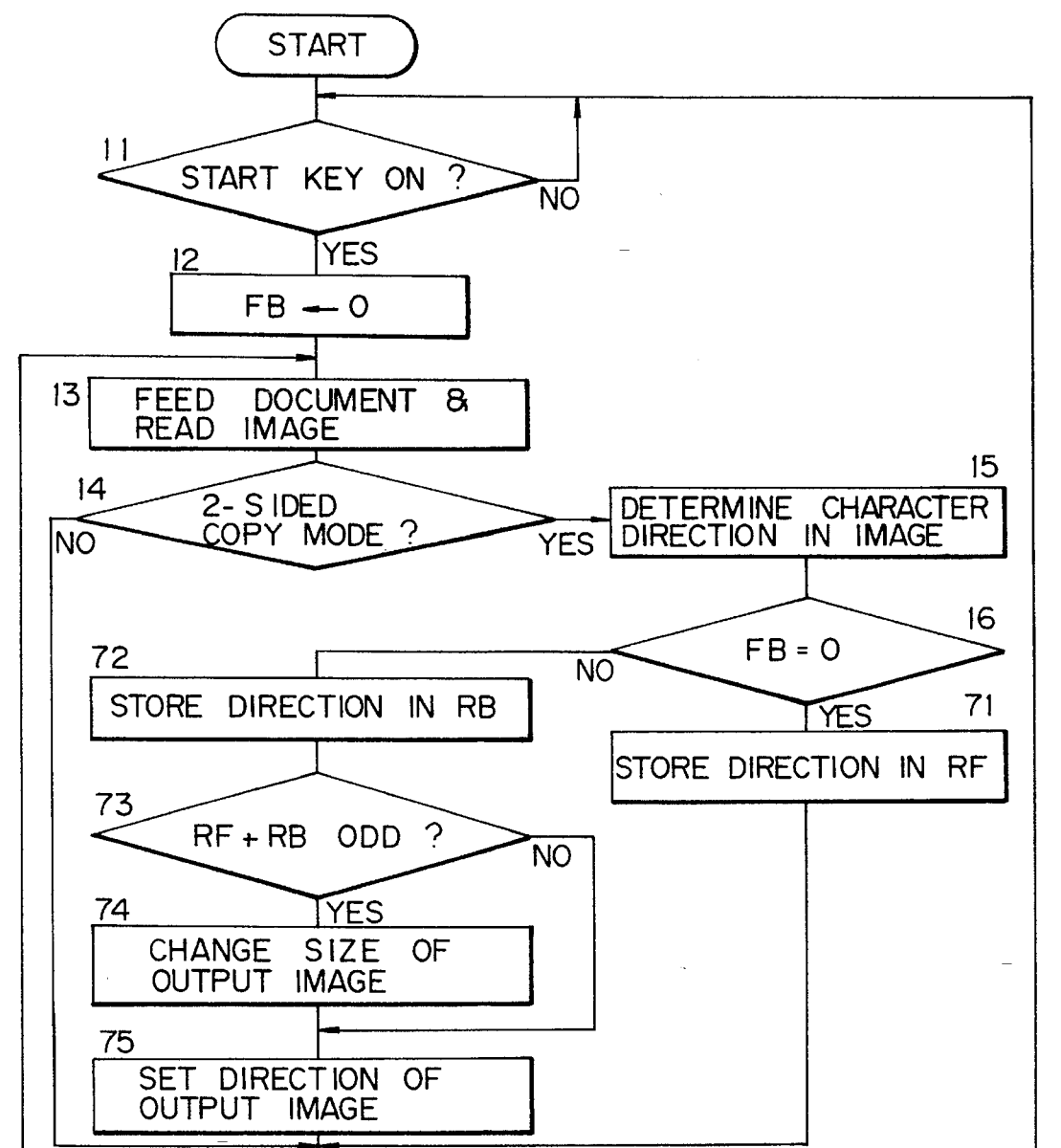
FIG. 5 is a flowchart showing another specific operation of the system controller shown in FIG. 1.
Figure 5B:
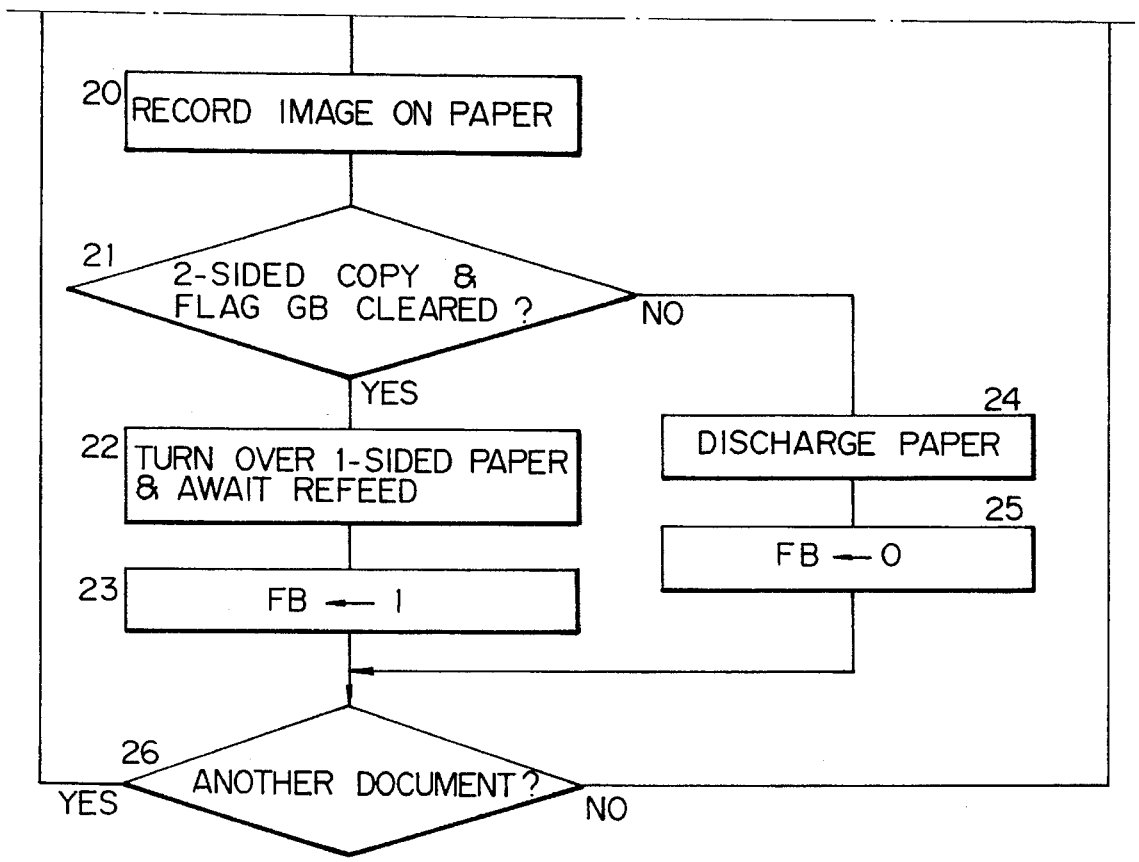

FIG. 5 shows another specific operation of the system controller. In FIG. 5, the steps identical with the steps shown in FIG. 1 are designated by the same reference numerals and will not be described to avoid redundancy.

In FIG. 5, in the two-sided copy mode and in the event of front copying (flag FB is cleared), the system controller stores a code representative of a detected direction in a register RF (step 71). In the event of rear copying (flag FB is set), the controller stores a code representative of a detected direction in a register RB (step 72) and then determines whether the sum of RF+RB is odd or even (step 73).

Figure 13:
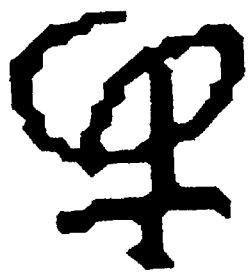
FIG. 13 is a plan view showing a single character pattern in four different orientations.
Figure 13:
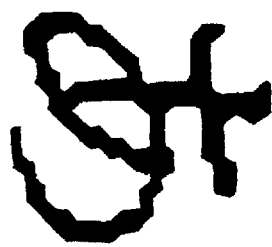
Figure 13:
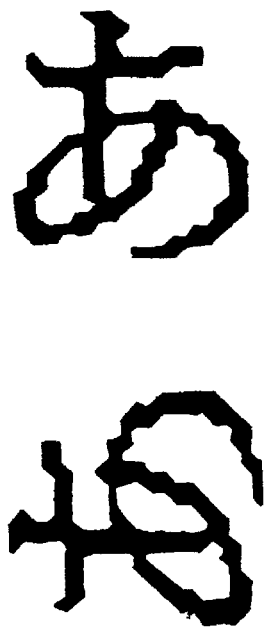

As shown in FIG. 13, this embodiment assigns direction codes 1, 2, 3 and 4 to the directions or angles of 0 degree, 90 degrees, 180 degrees and 270 degrees, respectively. In this condition, if the sum RF+RF is even, the image does not have to be rotated or only has to be rotated 180 degrees in the event of rear copying. However, if the sum is odd, the image has to be rotated 90 degrees or 270 degrees at the time of rear copying.

Figure 14:
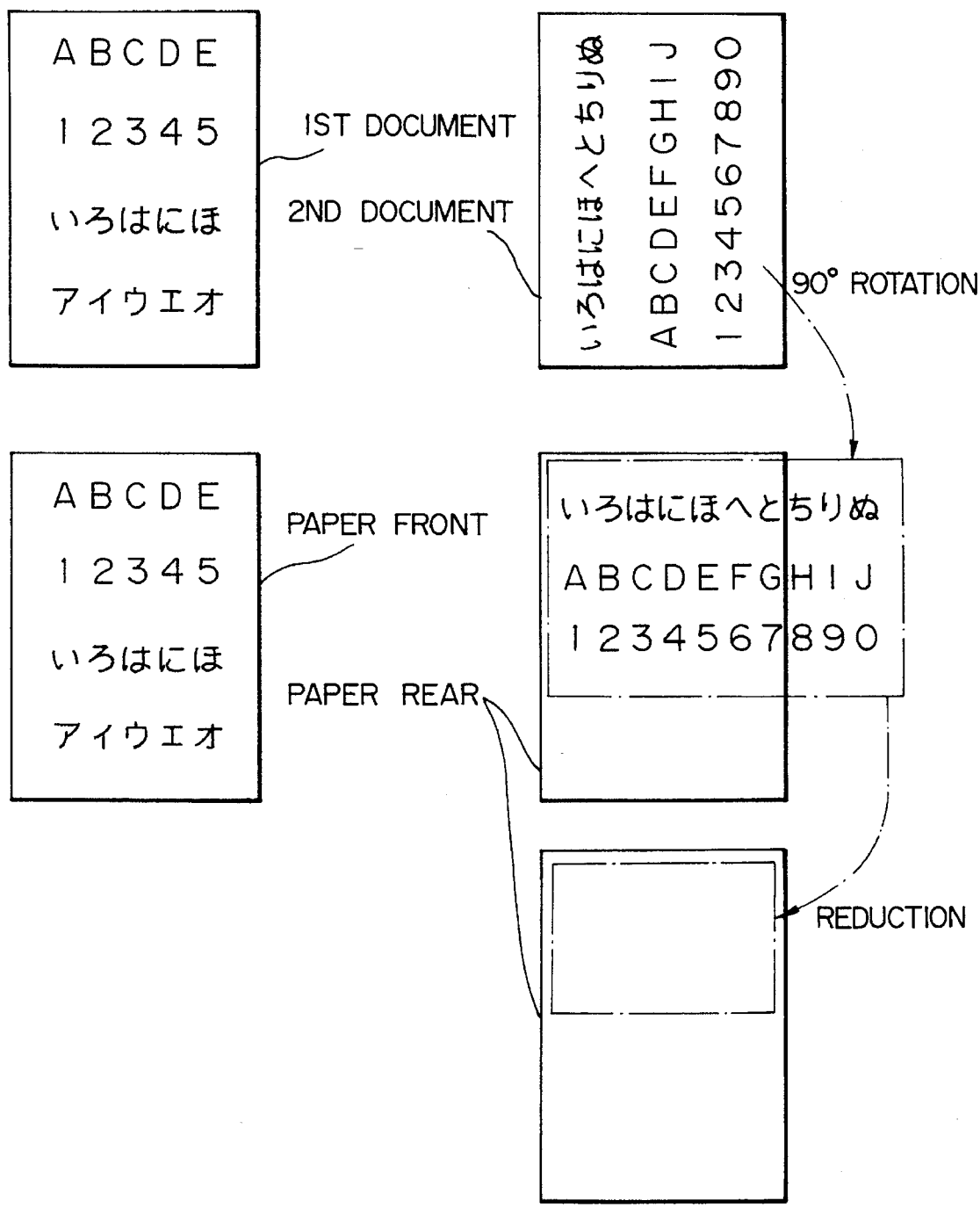
FIG. 14 is a plan view showing specific document images and images reproduced on a paper sheet.

Generally, paper sheets of regular sizes usable as documents or recording medium are oblong. Hence, when the image is rotated 90 degrees or 270 degrees, part of the image is apt to bulge out from the recordable area of the paper sheet. In light of this, when the sum RF+RB is odd, the system controller changes the size of the output image (step 74). Specifically, as shown in FIG. 14, the controller automatically reduces the output image if the image will bulge out from the paper sheet when rotated. At this instant, assuming that the first and second documents are of the same size, the magnification change ratio (reduction ratio) is obtainable by (length of short side of paper)/(length of long side of paper)×100 (%). Further, by detecting the projections of the image in the directions X and Y, it is possible to determine the sizes of the minimum rectangular range that can contain the entire image in the directions X and Y. Therefore, if (length of short side of paper)/(length of image)×100 (%) is used as a reduction ratio, the reduction of the image is suppressed to a minimum necessary one. Of course, if the resulting value is greater than 100, reduction is not necessary. When the first and second documents are different in size, their ratio in size has also to be taken into account in determining the magnification.

To make the output image smaller than the input image stored in the memory as stated above, it is only necessary to omit one pixel per n pixels of the image when the output image is generated (i.e. read out or written in).

Figure 15B:
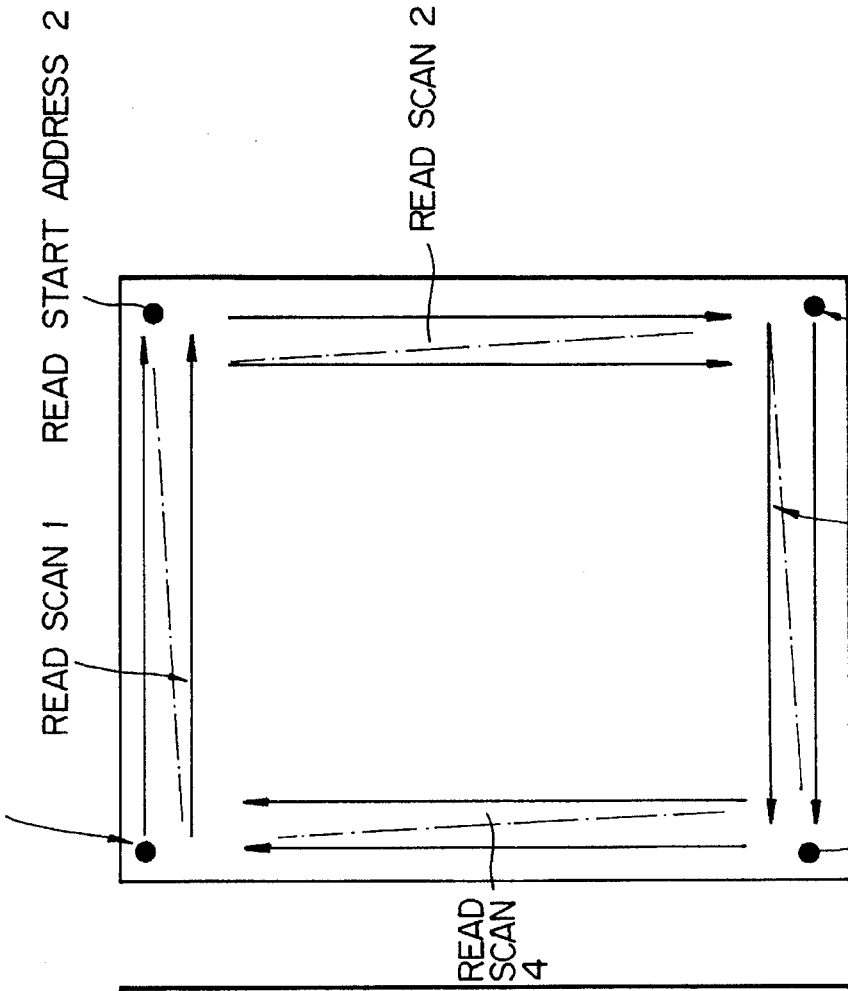
FIGS. 15A and 15B is a plan view showing a write start position and scannng direction and some different read start positions and scanning directions.
Figure 15A:
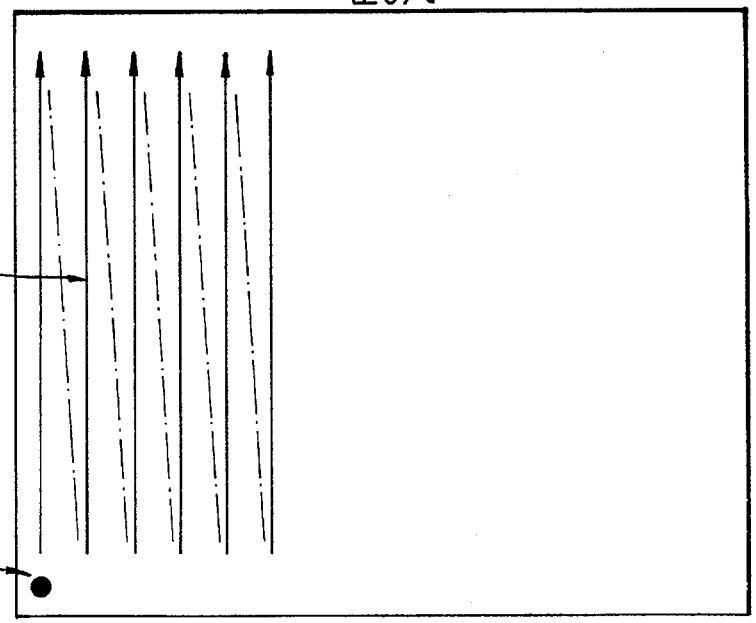

To effect rear copying in the two-sided copy mode, the direction of an output image is set up (step 75, FIG. 5). Four different directions, i.e., 0 degree, 90 degrees, 180 degrees and 270 degrees are available with the embodiment. As shown in FIGS. 15A and 15B, when a read start address 1 and a read scanning direction 1 are selected, the image writing and reading directions are coincident, i.e., the direction of the output image is 0 degree. When a read start address 2 and a read scanning direction 2 are selected, the direction of the output image is 90 degrees. When a read start address 3 and a read scanning direction 3 are selected, the direction of the output image is 180 degrees. Further, when a read start address 4 and a read scanning direction 4 are selected, the direction of the output image is 270 degrees. While in the case of front copying the direction is fixed at 0 degree, in the case of rear copying a particular direction is selected on the basis of the two direction codes stored in the registers RF and RB. For example, if RF is 2 (90 degrees) and RB is 3 (180 degrees), then 90 degrees will be selected to rotate the output image 90 degrees; if RF and RB are 4 (270 degrees) and 3 (180 degree), respectively, 270 degrees will be selected to rotate the output image –90 degrees.

Figure 6A:
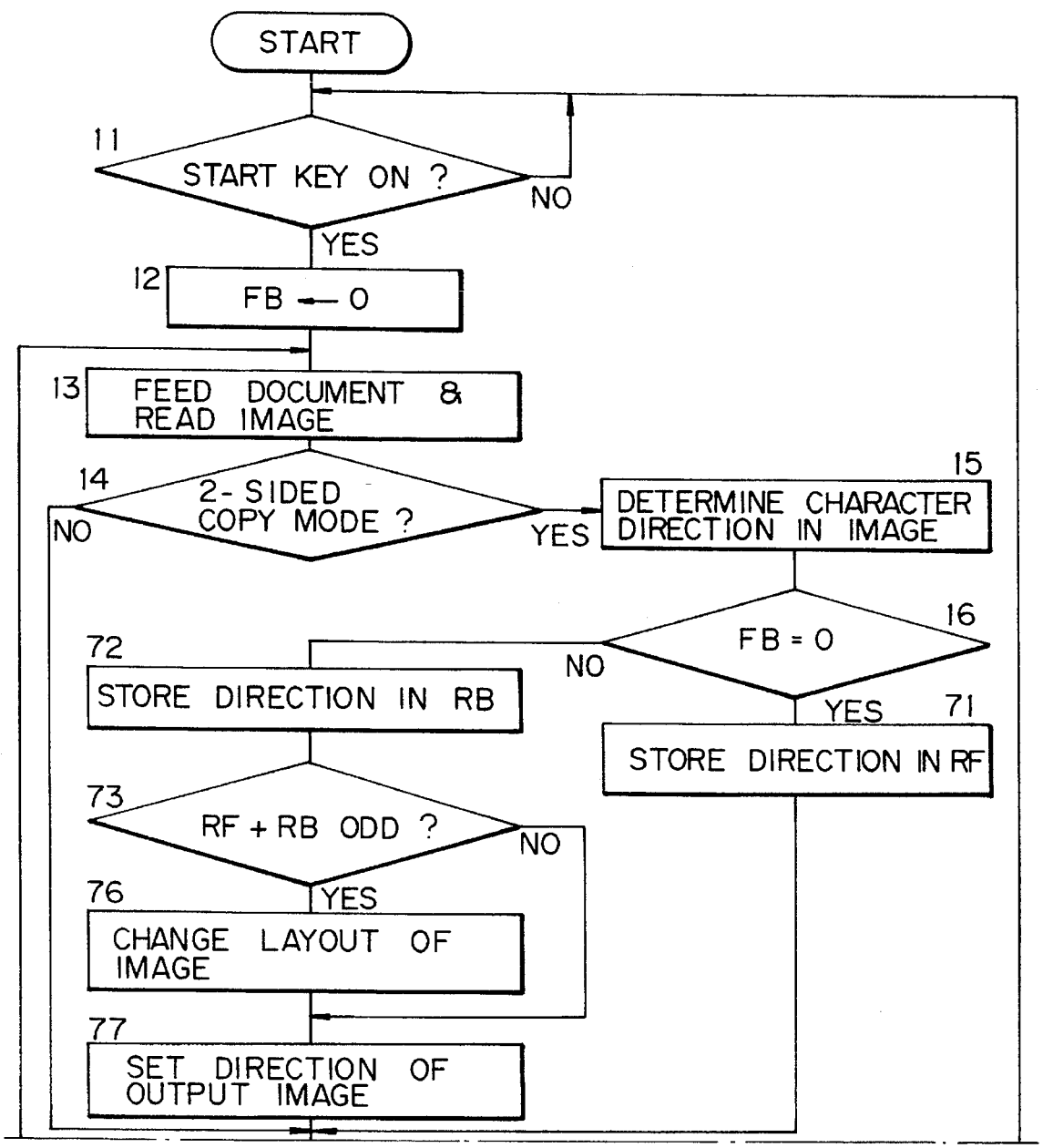
FIG. 6 is a flowchart indicative of another specific operation of the system controller shown in FIG. 1.
Figure 6B:
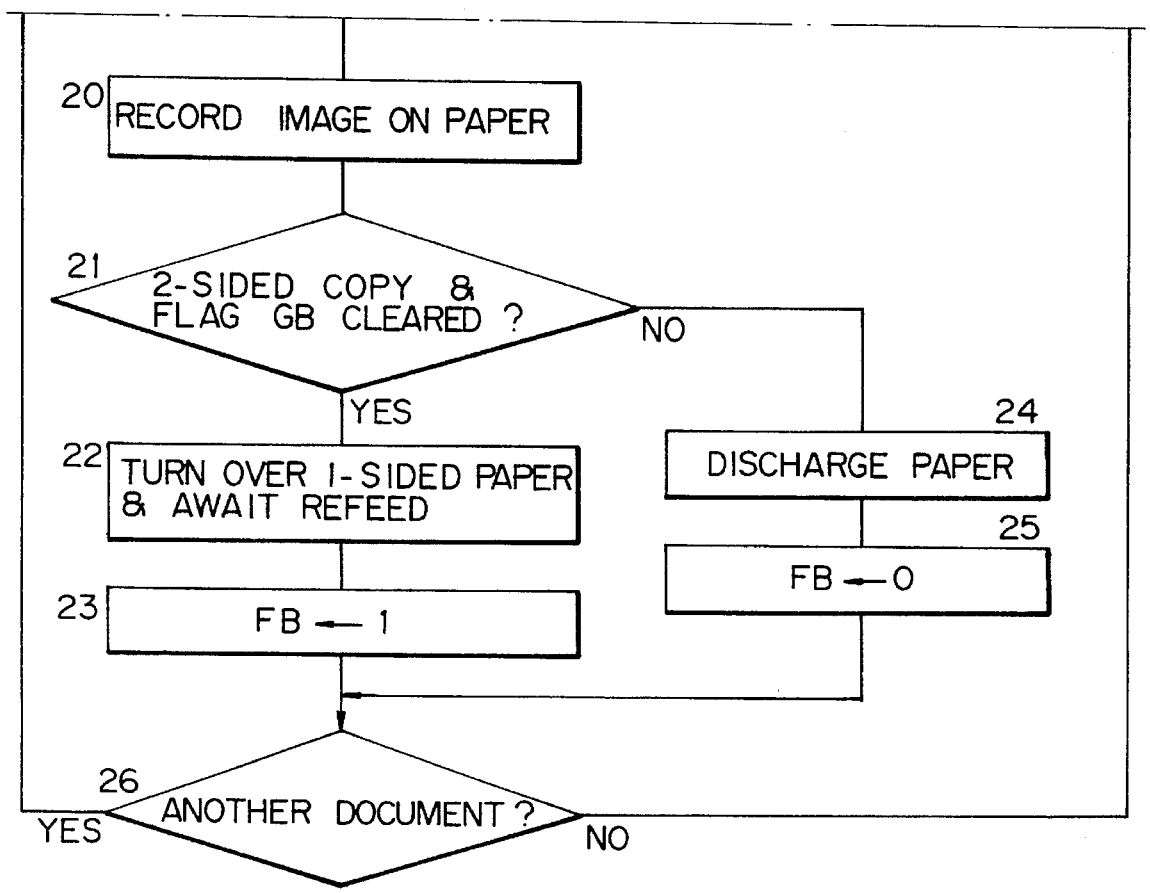

The problem with the above embodiment which reduces the image is that the resulting characters are hard to read. In addition, the images are unbalanced since a substantial part of the rear of the paper sheet is left blank and since the character size differs from the front to the rear. To eliminate these problems, a modified embodiment sown in FIG. 6 changes the layout of the image in a step 76 in addition to changing the size of the output image. Specifically, as shown in FIG. 6, the modification changes the arrangement of image elements on a character basis by changing the positions of new paragraphs and those of blank areas. This is successful in confining a rotated image in the recordable range without resorting to reduction.

Figure 7A:
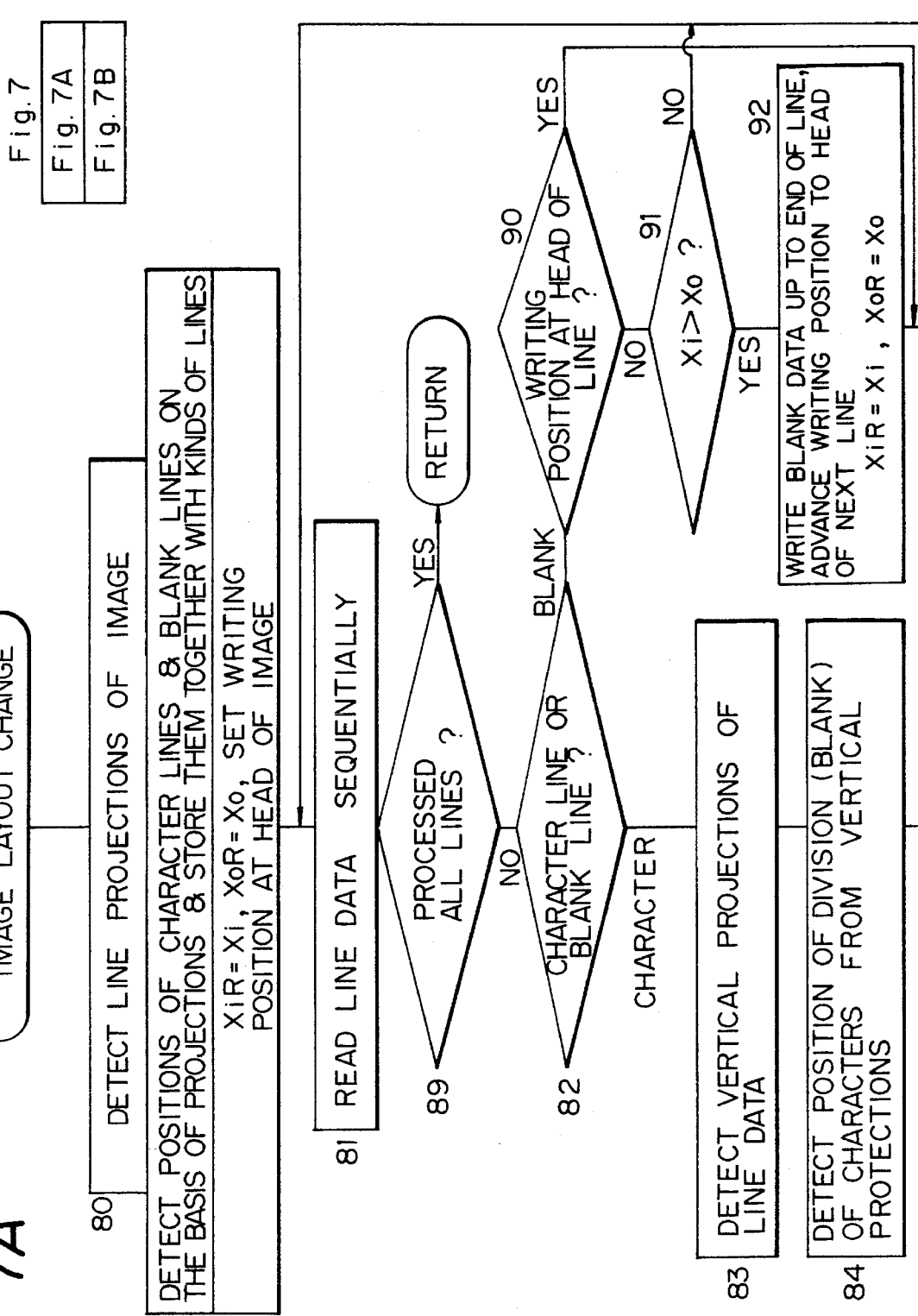
FIG. 7 is a flowchart representative of a specific procedure for changing the layout of an image.
Figure 7B:
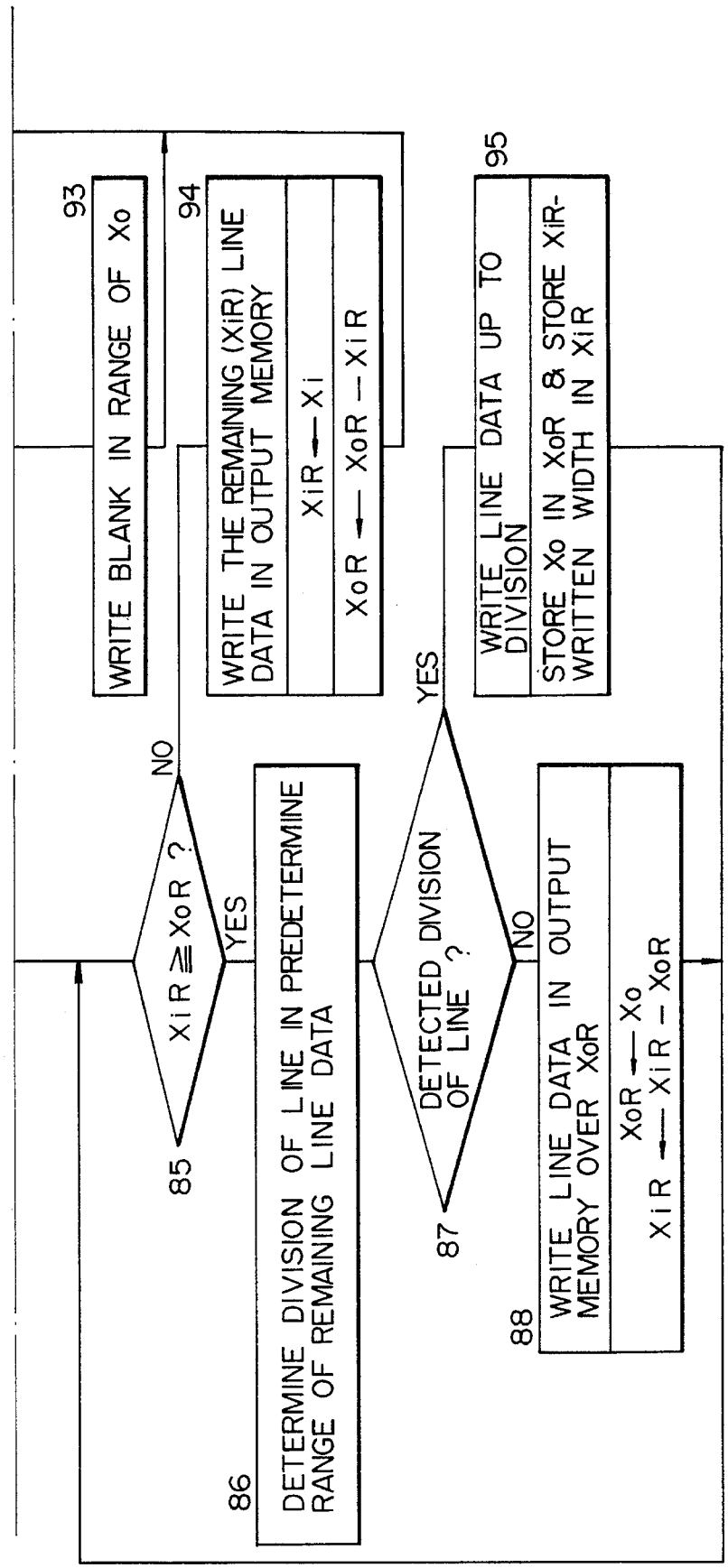
Figure 16A:
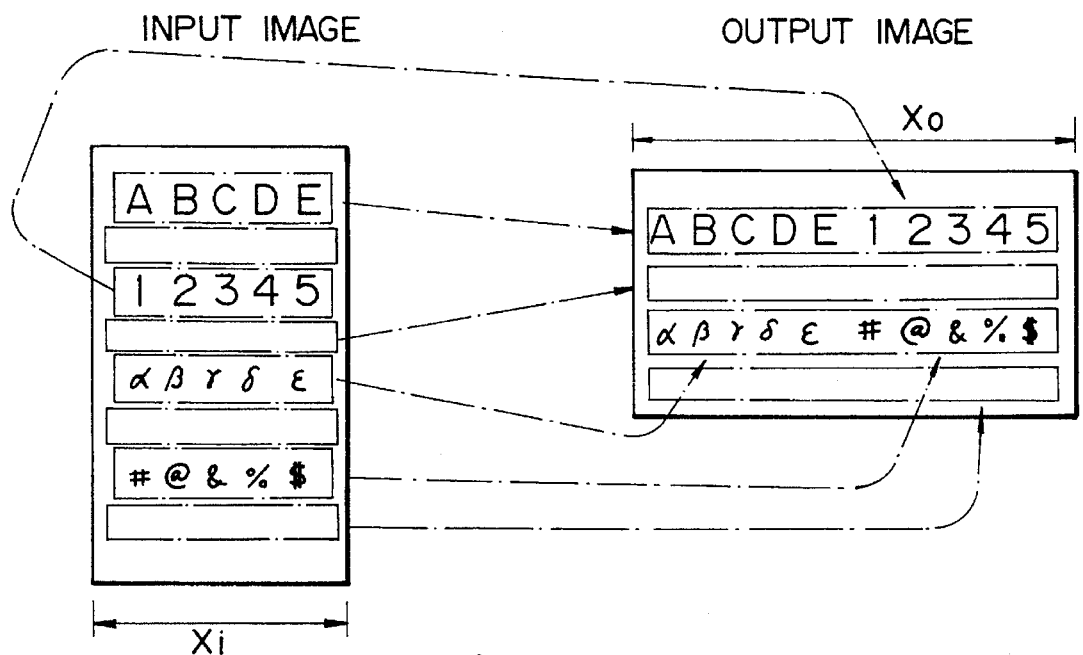
FIGS. 16A and 16B is a plan view showing specific input images and corresponding output images.
Figure 16B:
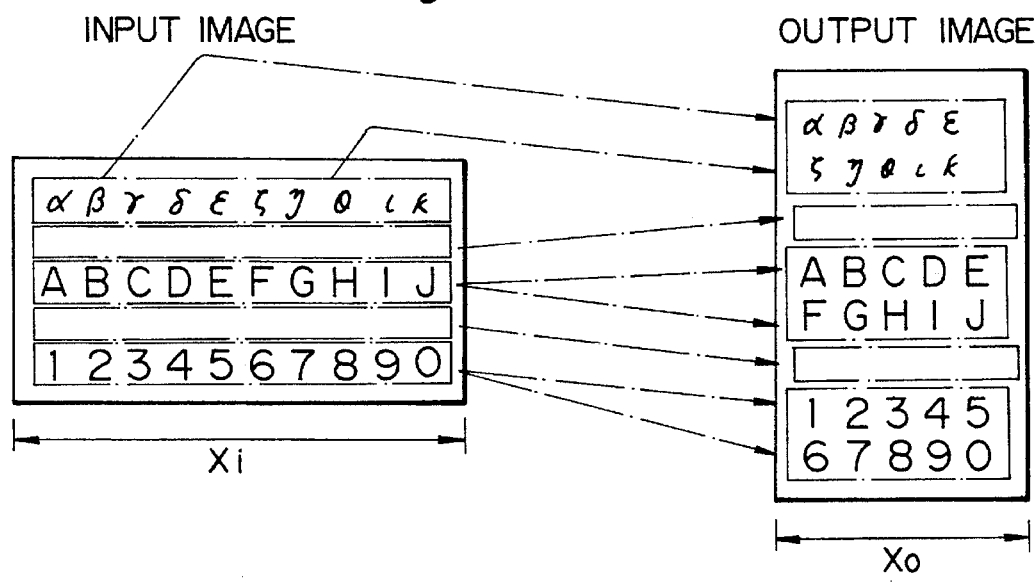

FIG. 7 shows a specific procedure for changing the layout as mentioned above. Since the processing for changing the layout consumes a relatively long period of time, the embodiment once generates an output image with a new layout in the page memory, reads the generated output image out of the page memory, and sends it to the printer. A reference will also be made to FIG. 16 for describing the procedure of FIG. 7.

First, in a step 80, the projections of the lines of an input image are detected, and then the positions where character lines exist and the positons where interline spaces and blank lines exist are stored together with their kinds (character lines and blank lines). Further, the width (line length) Xi of the input image and the width (line length) Xo of the output image are respectively written to registers XiR and XoR as initial values, and the leading position of the output image is selected to be the writing position in the page memory. In a step 81, the position data associated with the detected character lines and blank lines are referenced to sequentially extract the corresponding character lines or blank lines one by one out of the input image data. In the step 81, the following procedure is repeated with the image data extracted one line at a time, until the entire image has been processed (step 89). Specifically, if the extracted line is a character line (line range where characters exist) as determined in a step 82, a vertical projection of the character line (in the direction of height of characters in the case of lateral writing) is detected. Then, on the basis of the projection, the division (blank) between nearby characters is detected throughout the character line of interest (step 84).

Assume that XiR is greater than or equal to XoR, i.e., part of the extracted input character line data which has not been written as an output image yet have a width (XiR) greater than the width (XoR) of the remaining range of the line of the output image being processed, as determined in a step 85. Then, a step 86 is executed for identifying a division of the line within a predetermined range (e.g., a width covering two characters or so) preceding a prearranged new paragraph position included in the remaining input character line data (position XiR - XoR as counted from the leading end of the remaining line data). A division of the line may be a relatively broad blank or a punctuation mark; the presence/absence and the position of such a division are determined by character recognition processing. Since character recognition consumes a substantial period of time, it is executed only with the data near a prearranged new paragraph position.

When the remaining input character line data do not include any broad blank or punctuation mark as determined in a step 87, the input character line data are written to the memory as output image data over a width corresponding to the value XoR (step 88). The writing position advances every time such data are written to the memory. Xo is stored in XoR while the content of the XiR is reduced by the value XoR which is the width of written data. For example, assume an input image and a corresponding output image shown in a lower portion of FIG. 16. Then, initially XiR is equal to Xi, XoR is equal to Xo, and XiR is greater than XoR. Since a division of a line does not exist in the input image, the data "αβγδεζηνικ" extending over the width Xo are written to the memory as an output image. When a broad blank or a punctuation mark is detected in the remaining input character line data as determined in the step 87, the input character line data are written to the memory up to the position where the division exists (step 95). At the same time, blank data is written to the remaining portion of the line of interest in the output image, Xo is stored in XoR, and the content of XiR is reduced by the written width. The writing position of the output image advances to the leading end of the next line.

Assume that XiR is smaller than XoR, i.e., the width (XiR) of the input character line data having not been written as an output image is smaller than the width (XoR) of the remaining width of the line of the output image being processed, as determined in the step 85. Then, all the remaining input character line data extending over the width XiR are written to the memory as an outut image (step 94). At the same time, Xi is stored in XiR while the content of XoR is reduced by the written width XiR. For example, assuming an input image and a corresponding output image shown in an upper portion of FIG. 16, initially XiR is equal to Xi, XoR is equal to Xo, and XiR is smaller than XoR. Then, the data "ABCDE" extending over the width Xi are written to the memory as an output image while the value XoR is updated to XoR - XiR. After the step 94, the program returns to the step 81 for seleting a line to process next.

When the line extracted in the step 81 is a blank line as determined in the step 82, whether or not the writing position is coincident with the leading end of the line (step 90) is determined. If the answer of the step 90 is negative, Xi and Xo are compared (step 91). If Xi is not greater than Xo, the program returns to the step 81. For example, in the upper input image and upper output image of FIG. 16, the blank line between "ABCDE" and "12345" of the input image is ignored, i.e., no data is written in the output image since the writing position is located in the intermediate portion of the line and is not coincident with the head of the line in the output image. Hence, the next input character line "12345" is processed immediately.

If the writing position is located at the head of the line as determined in the step 90, blank data is written to the memory over the width Xo as an output image (step 93). For example, assuming the upper input image and upper output image of FIG. 16, after "ABCDE" and "12345" of the input image have been written as an output image, the writing position in the output memory is located at the head of the line between "ABCDE12345" and "αβγδε#@% $". Therefore, when the blank line between "12345" and "αβγδε" is processed, blank data is written over the entire width Xo (greater than Xi) of the output image. Likewise, assuming the lower input image and lower output image of FIGS. 16A and 16B, after "αβγδεζηΘικ" has been written as an output image, the writing position in the output memory is located at the head of the line between "ζηΘικ" and "ABCDE". Hence, when the blank line between "αβγδε . . . " and "ABCD . . . " is processed, blank data is written over the entire width Xo (smaller than Xi) of the output image.

If the writing position is not located at the head of the line and Xi is greater than Xo as determined in the steps 90 and 91, blank data is written from the writing position to the end of the line, i.e., over the width XoR as an output image. The writing position advances to the head of the next line, Xi is stored in XiR, and Xo is stored in XoR.

Figure 12B:
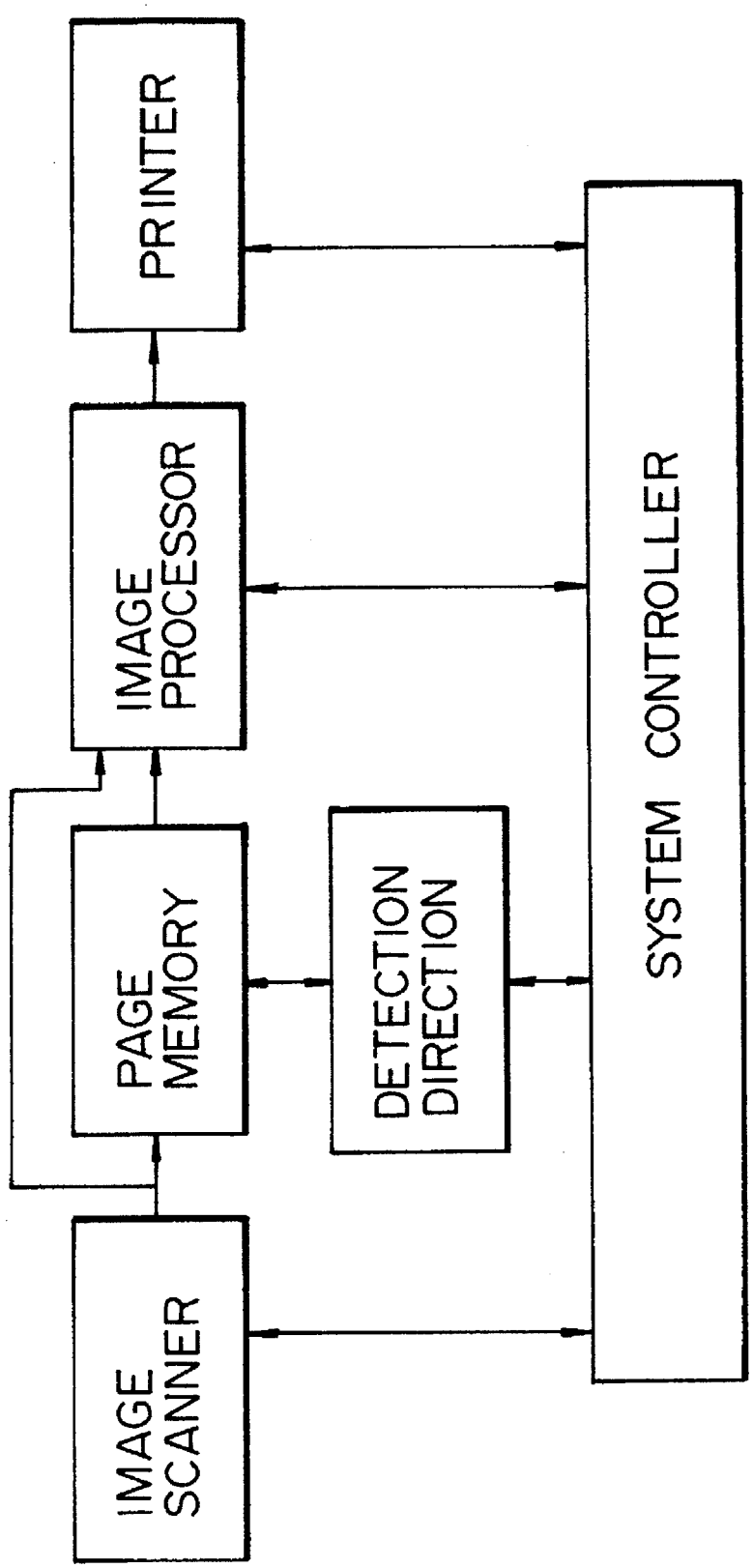
Figure 12C:
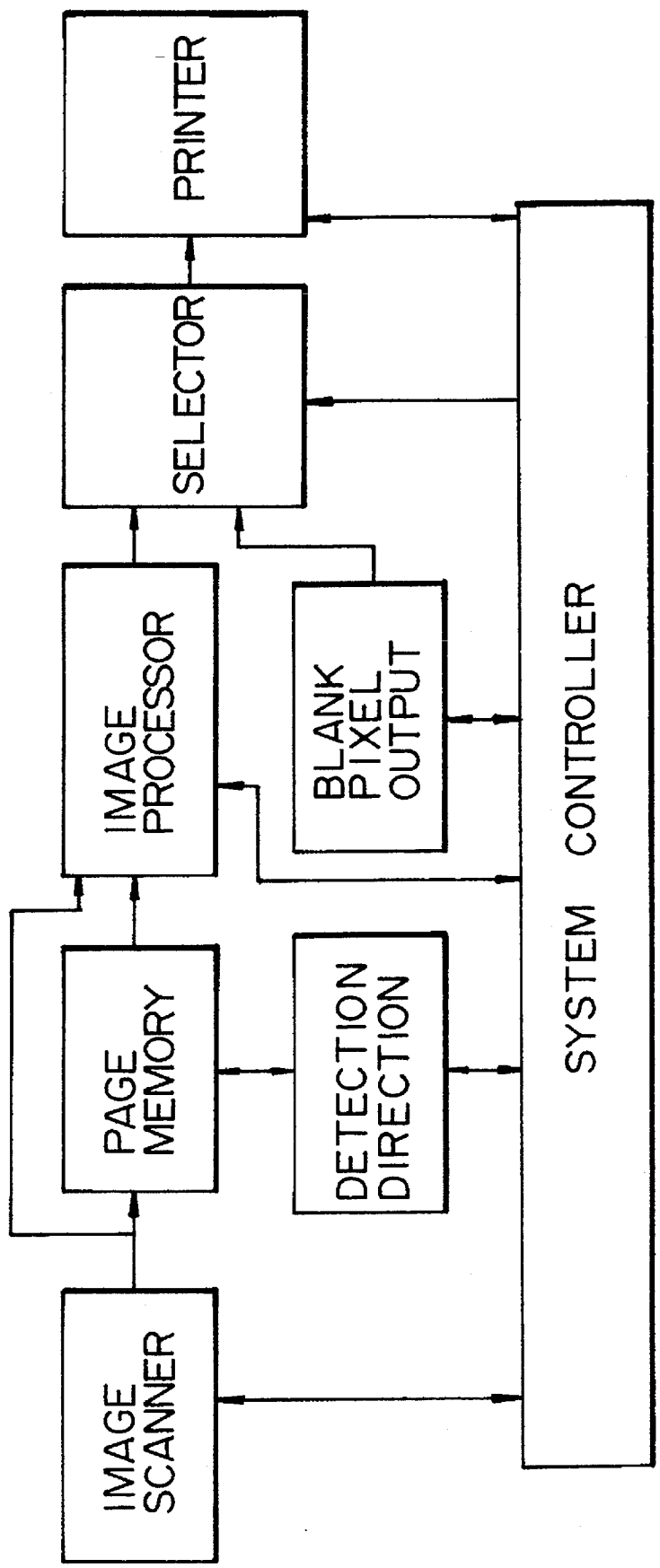

FIGS. 12B and 12C each show an alternative electrical arrangement. The arrangement of FIG. 12B additionally includes a path along which the image data from the image scanner are directly fed to the image processor, bypassing the page memory. This arrangement has the following advantage. While the recognition of a direction of characters or similar processing consumes a relatively long period of time, an input image to be recorded on the front of a paper sheet in the two-sided copy mode can be directly sent to the printer without any manipulation. It follows that executing front copying in parallel with the detection of a direction is successful in reducing the copying time in the two-sided copy mode. In this case, an input image to be recorded on the rear of the paper sheet and temporarily stored in the page memory should be sent to the printer after being rotated or turned upside down on the basis of a detected direction of charaters.

The arrangement of FIG. 12C additionally includes constituents for outputting blank pixel data. Specifically, a selector selectively applies to the printer the output image from the image processor or blank pixel data. Assume that character recognition or similar time-consuming processing is omitted in the event of changing the layout of an image. Then, when an image is read out of the memory and sent to the printer, the read address may be switched over to change the layout of the image on a real time basis. In such a case, the exclusive hardware for generating blank pixel data shown in FIG. 12C will promote easy change of layout.

While the present invention has been shown and described in relation to the two-sided copy mode available with a copier, it is capable of, even in modes other than the two-sided mode, dealing with documents each carrying an image oriented in a differnt direction. Specifically, in a mode other than the two-sided mode, it is only necessary to orient the characters of all the copy images in conformity to the direction of characters detected on the first document image by turning them upside down or rotating them. If desired, the directions of characters may even be regulated to a fixed direction.

In summary, it will be seen that the present invention provides an image recorder having unprecedented advantages, as enumerated below.

(1) The recorder is capable of regulating the direction of copy images automatically. Hence, in a two-sided copy mode, for example, irregular copies are eliminated even when documents are positioned in different directions.

(2) The recorder enhances accurate recognition of the direction of characters existing in a document image.

(3) In a two-sided copy mode, the recorder does not have to change the direction of an image to be formed on the front or first side of a paper sheet, thereby reducing the copying time.

(4) When an output image should be rotated 90 degrees or 270 degrees, the recorder prevents part of the input image from being lost and improves image quality since reduction is not necessary. Moreover, the recorder lays out character lines attractively in an output image.

Various modifications will become possible for those skilled in the art after receiving the teachings of the present disclosure without departing from the scope thereof.

What is claimed is:

1. An image recorder comprising:

inputting means for inputting input image data representative of a document comprising a plurality of paper sheets which may be oriented in different directions;

storing means for storing the input image data inputted by said inputting means;

direction determining means for processing the input image data stored in said storing means to determine a direction of character data included in said input image data, wherein the direction determining means detects the direction of a plurality of character elements and the direction of the character data is determined based on a majority of the detected directions of the plurality of character elements;

direction changing means for changing, when the determined direction of the character data determined by said direction determining means differs from a predetermined direction, an orientation of an output image data including a plurality of sheets of output image data, corresponding to the plurality of sheets of the input image data, relative to the input image data by turning said output image data upside down or rotating said output image data so that each of the plurality of sheets of the output image data is consistently oriented; and recording means for recording the output image data consistently oriented in the predetermined direction on a predetermined recording medium.

2. An image recorder as claimed in claim 1, wherein said direction changing means generates, when the output image is rotated, said output image in a particular magnification by enlargement or reduction based on a size of an input image in a widthwise or lengthwise direction and a size of the recording medium in a lengthwise or widthwise direction.

3. An image recorder as claimed in claim 1, wherein said direction changing means generates, when an output image is rotated, said output image by arranging the character data in positions different from positions in the input image based on a size of said input image in a widthwise or lengthwise direction and a size of a recording medium on which the output image data is recorded in a lengthwise or widthwise direction.

4. An image recorder as claimed in claim 1, wherein said direction changing means arranges, when the output image is rotated, the character data in positions different from positions in the input image data based on a size of said input image in a widthwise or lengthwise direction and a size of a recording medium on which the output image data is recorded in a lengthwise or widthwise direction, identifies a first blank area between consecutive character lines in said input image, and forms a second blank area of a same spacing as said first blank area between consecutive character lines of said output image data.

5. An image recorder comprising:

inputting means for inputting input image data representative of a document comprising a plurality of paper sheets which may be oriented in different directions;

storing means for storing the input image data inputted by said inputting means;

direction determining means for processing the input image data stored in said storing means to determine a direction of character data included in said input image data, wherein the direction determining means detects the direction of a plurality of character elements and the direction of the character data is determined based on a majority of the detected directions of the plurality of character elements;

direction changing means for changing, when the determined direction of the character data determined by said direction determining means differs from a predetermined direction, an orientation of an output image data including a plurality of sheets of an output image data, corresponding to the plurality of sheets of the input image data, relative to the input image data by turning said output image data upside down or rotating said output image data so that each of the plurality of sheets of the output image data is oriented consistently; and recording means for recording the output image data oriented consistently in the predetermined direction on a predetermined recording medium;

wherein said recording means records an image on the front and the rear of each recording medium, said direction changing means determining the predetermined direction in conformity to a direction of characters of an image to be recorded on the front and, only for an image to be recorded on the rear, changing an orientation of an output image only if a direction of characters of an input image differs from said predetermined direction.

6. An image recorder as claimed in claim 5, wherein said direction changing means generates, when the output image is rotated, said output image in a particular magnification by enlargement or reduction based on a size of an input image in a widthwise or lengthwise direction and a size of the recording medium in a lengthwise or widthwise direction.

7. An image recorder as claimed in claim 5, wherein said direction changing means generates, when an output image is rotated, said output image by arranging the character data in positions different from positions in the input image based on a size of said input image in a widthwise or lengthwise direction and a size of a recording medium on which the output image data is recorded in a lengthwise or widthwise direction.

8. An image recorder as claimed in claim 5, wherein said direction changing means arranges, when the output image is rotated, the character data in positions different from positions in the input image data based on a size of said input image in a widthwise or lengthwise direction and a size of a recording medium on which the output image data is recorded in a lengthwise or widthwise direction, identifies a first blank area between consecutive character lines in said input image, and forms a second blank area of a same spacing as said first blank area between consecutive character lines of said output image data.

* * * * *